(12) United States Patent
El-Gasseir et al.

(10) Patent No.: US 8,090,479 B2
(45) Date of Patent: Jan. 3, 2012

(54) ELECTRICITY MARKET-ORIENTED DC-SEGMENTATION DESIGN AND OPTIMAL SCHEDULING FOR ELECTRICAL POWER TRANSMISSION

(75) Inventors: Mohamed M. El-Gasseir, Lafayette, CA (US); H. D. Kenneth Epp, Vancouver (CA)

(73) Assignee: DC Interconnect Inc., Vancouver, British Columbia (CA)

( * ) Notice: Subject to any disclaimer, the term of this patent is extended or adjusted under 35 U.S.C. 154(b) by 0 days.

(21) Appl. No.: 12/620,326

(22) Filed: Nov. 17, 2009

(65) Prior Publication Data

US 2010/0076618 A1    Mar. 25, 2010

Related U.S. Application Data

(63) Continuation of application No. 10/547,867, filed as application No. PCT/US2004/006888 on Mar. 5, 2004, now Pat. No. 7,620,482.

(60) Provisional application No. 60/451,628, filed on Mar. 5, 2003.

(51) Int. Cl.
*G06F 19/00* (2011.01)

(52) U.S. Cl. .......... 700/286; 209/2; 700/291

(58) Field of Classification Search .......... 700/286, 700/291, 297; 209/2; 705/36, 412
See application file for complete search history.

(56) References Cited

U.S. PATENT DOCUMENTS

| | | | |
|---|---|---|---|
| 6,026,349 A * | 2/2000 | Heneman .......... | 702/60 |
| 2002/0087234 A1 | 7/2002 | Lof et al. | |
| 2004/0087234 A1 * | 5/2004 | Lambert et al. .......... | 442/377 |

OTHER PUBLICATIONS

Stahlhan et al.; Uncertain power flows and transmission expansion planning, 2005, IEEE, p. 489-496.*
Nietsch et al., Optimizing Power Distribution Networks, 2001, IEEE, p. 18-21.*
Heckmann et al., Enhanced AC Power-Flow Solutions for Reliability Analyses, Apr. 2001, ETEP vol. 11 NO2., p. 79-88.*
M. Kumbale, T. Rusodimos, F. Xia, and R. Adapa, Trelss: A Computer Program for Transmission Reliability Evaluation of Large-Scale Systems, EPRI TR-100566 3833-1, Apr. 1997, 9 pages, vol. 2.

(Continued)

*Primary Examiner* — Kidest Bahta
(74) *Attorney, Agent, or Firm* — Michael G. Johnston; Moore & Van Allen PLLC

(57) ABSTRACT

A method of segmenting a power distribution network which comprises a plurality of AC power generating stations synchronously interconnected by AC power transmission paths is disclosed. The stations operate within associated market sectors and are subject to associated market rules. The method includes identifying all transmission paths which extend between differing ones of the sectors and, in each of said transmission paths so identified, segmenting the path by inserting a controllable DC link at a selected location in the path. Each of the sectors is then operated asynchronously. Power flow and counter-flow between the sectors is controlled by controlling the DC links. As well there is disclosed a power transmission network which comprises a plurality of AC power generating stations operable within associated market sectors subject to associated market rules; power transmission paths interconnecting the stations, at least some of the paths extending between differing ones of the sectors; and wherein each of the paths which extend between differing ones of the sectors includes a controllable DC link in the path for desynchronizing the differing sectors; and, control means operatively connectable to each of the DC links for controlling power flow between the differing sectors.

8 Claims, 29 Drawing Sheets

OTHER PUBLICATIONS

Y. V. Makarov and R. C. Hardiman, "Risk, Reliability, Cascading, and Restructuring", Oct. 2003, 13 pages, CIGRE/IEEE Quality and Security of Electric Power Delivery Systems, Montreal, Quebec, Canada.

R.C. Hardiman, M. Kumbale, and Y.V. Makarov, "Multi-Scenario Cascading Failure Analysis Using TRELSS", Oct. 2003, 5 pages, CIGRE/IEEE, PES International Symposium on Quality and Security of Electric Power Delivery Systems, Montreal, Quebec, Canada.

Roy Billinton and Ronald N. Allan, "Reliability Evaluation of Engineering Systems: Concepts and Techniques", 1992, 10 pages, Plenum Press.

J. Wang, "Efficient Monte Carlo Simulations Methods in Statistical Physics", Mar. 15, 2011, 17 pages, Department of Computational Science, National University of Singapore, Singapore.

Frederick S. Hillier and Gerald I. Lieberman, "Operations Research", 1974, 21 pages, Holden-Day, Inc.

Burns and G. Gross, "Value of Service Reliability", Aug. 1990, 10 pages, vol. 3, IEEE Trans. Power Syst.

S. Yin, R. Chang and C. Lu, "Reliability Worth Assessment of High-Tech Industry", Feb. 2003, 4 pages, vol. 18, No. 1, IEEE Trans. Power Syst.

George C. Loehr, Take My Grid, Please! A Daring Proposal for Electric Transmission, www.pur.com/pubs/3728.cfm, May 1, 2001, 6 pages.

DC Interconnect Inc., Canadian Application No. 2,562,103, Office Action dated Oct. 6, 2011.

Hingorani, N. G., High Voltage DC Transmission: A power electronics workhorse, IEEE Spectrum, 1996, pp. 63-72, vol. 33, No. 4.

* cited by examiner

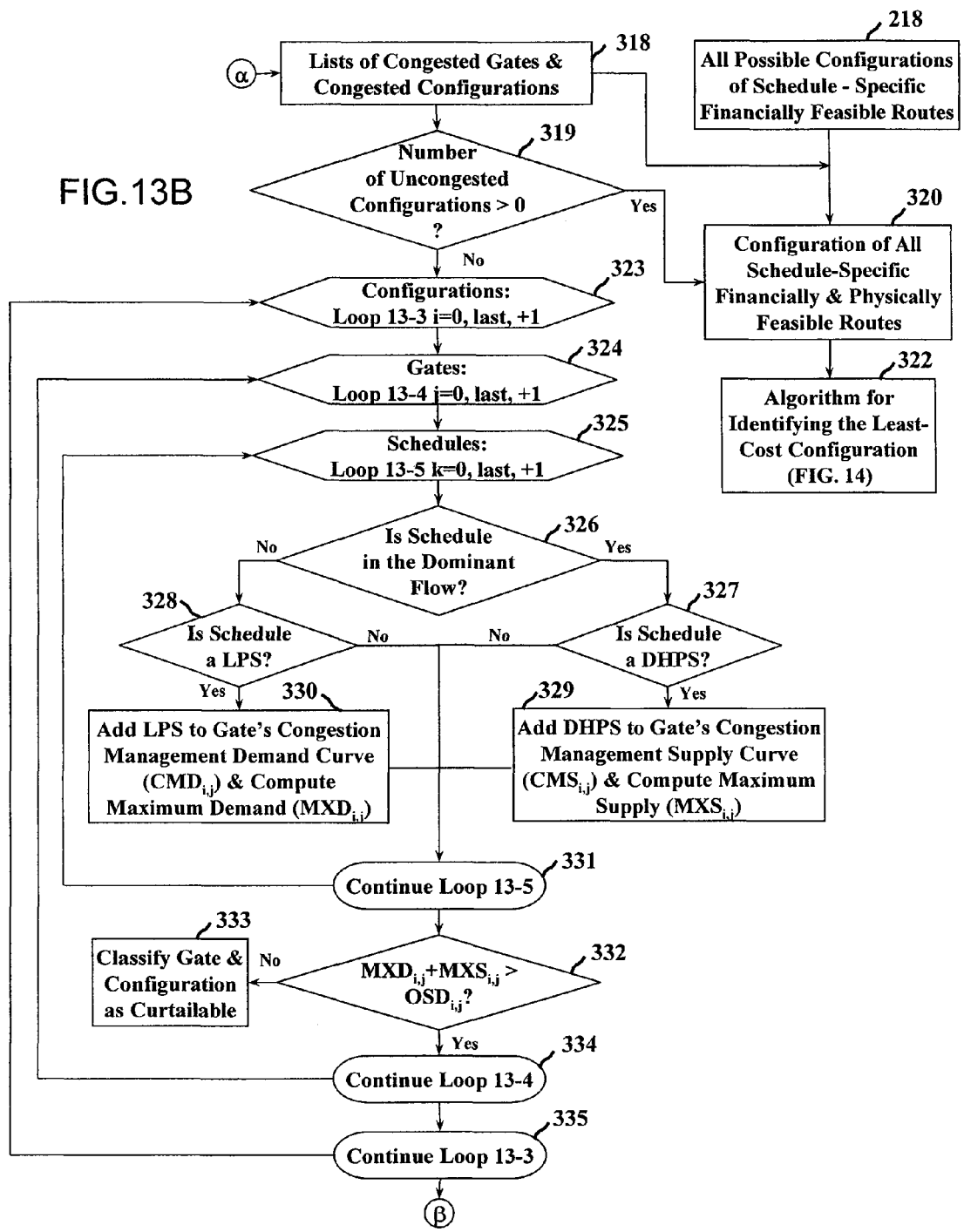

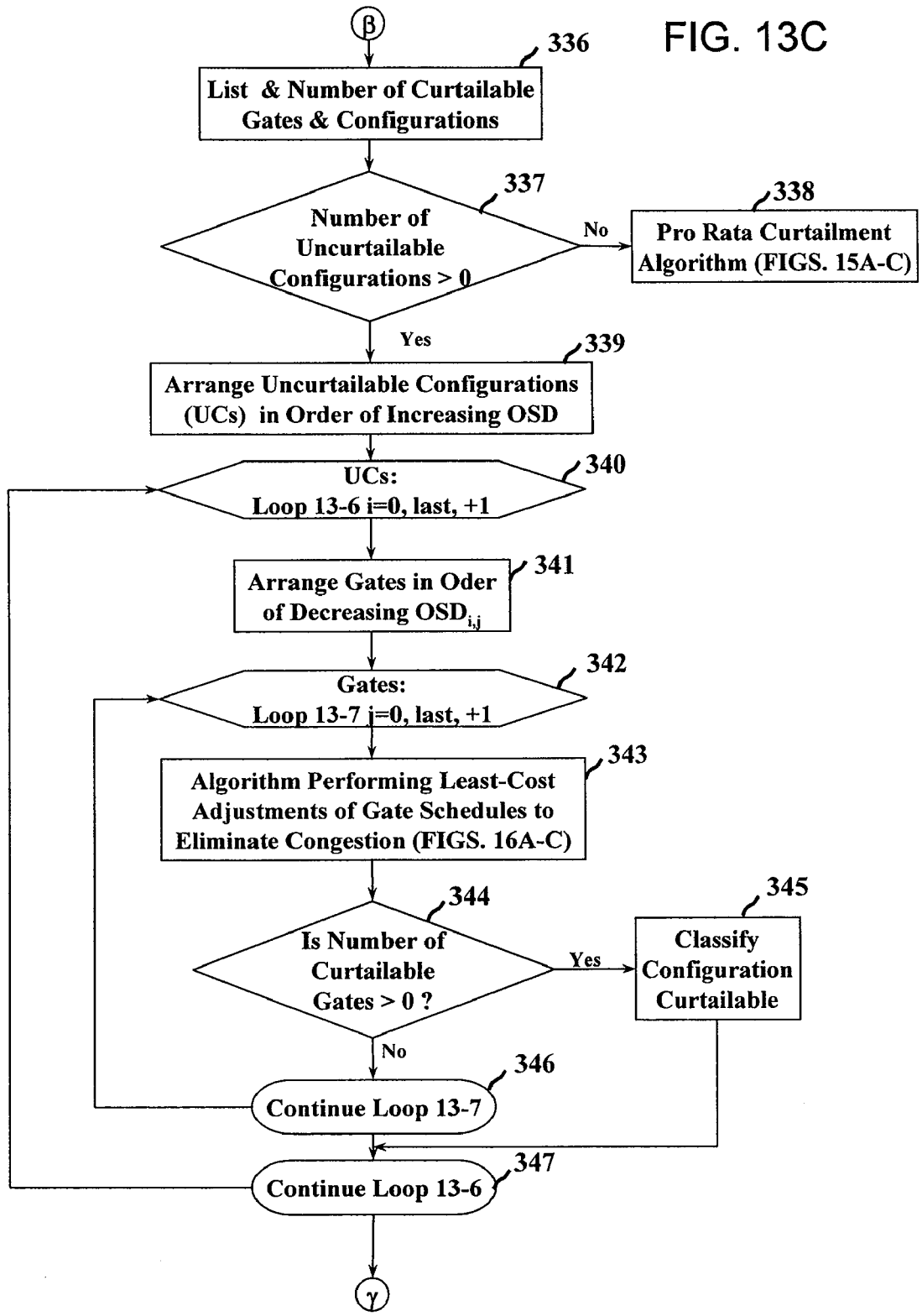

ELECTRICITY MARKET-ORIENTED DC-SEGMENTATION DESIGN AND OPTIMAL SCHEDULING FOR ELECTRICAL POWER TRANSMISSION

CROSS-REFERENCE TO RELATED APPLICATIONS

This application is a continuation application of U.S. patent application Ser. No. 10/547,867, filed Jul. 24, 2006, now U.S. Pat. No. 7,620,482, which is a national stage filing of international application no. PCT/US2004/06888, filed Mar. 5, 2004, and claiming priority to U.S. Provisional Patent Application No. 60/451,628, filed Mar. 5, 2003, entitled "ELECTRICITY MARKET-ORIENTED DC-SEGMENTATION DESIGN AND OPTIMAL SCHEDULING FOR ELECTRICAL POWER TRANSMISSION", naming Mohamed M. El-Gasseir and H. D. Kenneth Epp as the inventors. The contents of all of the above-listed applications are incorporated herein by reference in their entirety, and the benefit of the filing dates of the earlier filed applications are hereby claimed for all purposes that are legally served by such claim for the benefit of the filing date.

BACKGROUND OF THE INVENTION

An accelerated growth of inter-regional electrical power transmission trading activities has sharply increased the frequency of transmission congestion and associated price spikes, leading in some cases to significant rise in electricity retail prices, and the bankruptcy of major utilities and power marketing companies.

There are two ways for averting or mitigating this problem: (1) investing heavily to upgrade existing grids and to develop new transmission ties; and/or (2) increasing the available transfer capability (ATC). In addition to public opposition and the high costs of developing new transmission rights of way, the first approach has proved to be elusive.

The second approach requires much less capital investment and is environmentally much more benign. However, there are no currently used or proposed processes for allocating and scheduling transmission service while explicitly increasing ATC for wholesale electricity trade.

The present invention addresses a pressing need for a better way of utilizing existing transmission infrastructures.

BRIEF SUMMARY OF THE INVENTION

In the present invention, there is provided a novel method as described herein of segmenting a pre-existing multi-regional alternating current (ac) grid into an interconnected set of ac sectors to facilitate the institution and operation of efficient regional and inter-regional electricity power transmission by making use of (1) the controllability of power flow through direct current (dc) transmission gates between ac grid sectors, and (2) the ability to expand ATC by liberating latent transfer capabilities of existing transmission infrastructure and through economic scheduling of electricity counter-flows.

In one aspect of the present invention, there is provided an electrical power transmission system as described herein when segmented pursuant to the foregoing method.

In a further aspect of the present invention, there is provided a method as described herein of allocating the costs of such segmentation.

In yet another aspect of the present invention, there is provided a method as described herein of achieving optimal operation of a segmented ac grid through efficient inter-sector scheduling of regional and inter-regional electricity trade.

The system and methodology make use of dc interconnection technology to interconnect otherwise isolated ac sectors at design locations where a pre-existing ac grid is segmented. Decomposing large ac grids into dc-linked ac sectors leads to a significant number of benefits including:

(1) Facilitating efficient solutions for otherwise intractable seams issues that continue to hinder the development of efficient inter-regional electricity markets;
(2) Liberating latent transfer capabilities of existing transmission infrastructure by eliminating stability limits on line ratings and loop flows in the grid;
(3) Preventing the cascading of major grid disturbances and subsequent outages over several service regions; and,
(4) Reducing inter-sector congestion problems.

Cost allocation follows the causation principle by identifying and separating the investment needed to facilitate the development and operation of efficient markets from the costs of enhancing grid reliability at regional and inter-regional levels. This step allows the assignment of proper costs to the appropriate capital recovery mechanism.

Optimal operation of segmented grids is achieved through the implementation of a novel process referred to herein as the Inter-Market Transmission Access Optimization and Scheduling (IMTAOS) process. IMTAOS accomplishes optimal operation by:

(1) controlling inter-sector power flows; and,
(2) enabling intra- and inter-sector ATC expansion.

Complete control of inter-sector power flows is made possible by the dc-interconnection technology used to segment the pre-existing ac grid. ATC expansion, beyond the gains achieved through upgrades such as line conversions or generated from eliminating or reducing loop flows and stability limits, is realized through the economic scheduling of counter-flows. The schedules generated by IMTAOS ensure verifiable alignment of contract paths with the physical paths of power flows, thereby removing a major source of the difficulties that have plagued the development of efficient electricity markets to this day. The developed scheduling process also leads to another highly sought result; namely, market liquidity of transmission rights.

The foregoing and other features and advantages of the present invention will now be described with reference to the drawings listed below.

DETAILED DESCRIPTION

I. Background

Introduction

As indicated above, segmentation refers to decomposing an ac interconnection into several sectors such that power flows among the sectors will proceed only through a network of dc gates. An ac interconnection is a grid comprised of several substantially interconnected control areas each of which include one or more service territories sharing a distinct set of transmission and bulk-power trading tariffs (e.g., the three ac interconnections serving the 48 contiguous states of the U.S.).

A control area is a transmission system or systems and associated infrastructure(s), owned by one or more entities but governed by a single regime of cost of service tariff(s), market rules, and operation and control apparatus and management.

A sector is a portion of the ac interconnection grid identifiable by a system of dc gates that is capable of controlling all of the sector's real power exchanges (imports and exports) with the rest of the ac interconnection at all times of system operation.

A dc gate is a dc interconnection device linking two ac sectors such that its location and operation in tandem and in combination with similar devices appropriately located on a segmented grid would provide a mechanism for total control of the magnitudes and directions of inter-sector power flows. A gate may consist of: (1) one or more pairs of back-to-back (BTB) ac-to-dc and dc-to-ac converters on transmission ties linking two sectors, or (2) a set of ac-to-dc and dc-to-ac converters at the ends of converted ac ties between two sectors, and (3) a combination of (1) and (2). In addition to separating sectors by gates, segmentation may also involve establishing cuts in an ac interconnection where cost considerations do not justify investing in dc technology.

Figure 1:
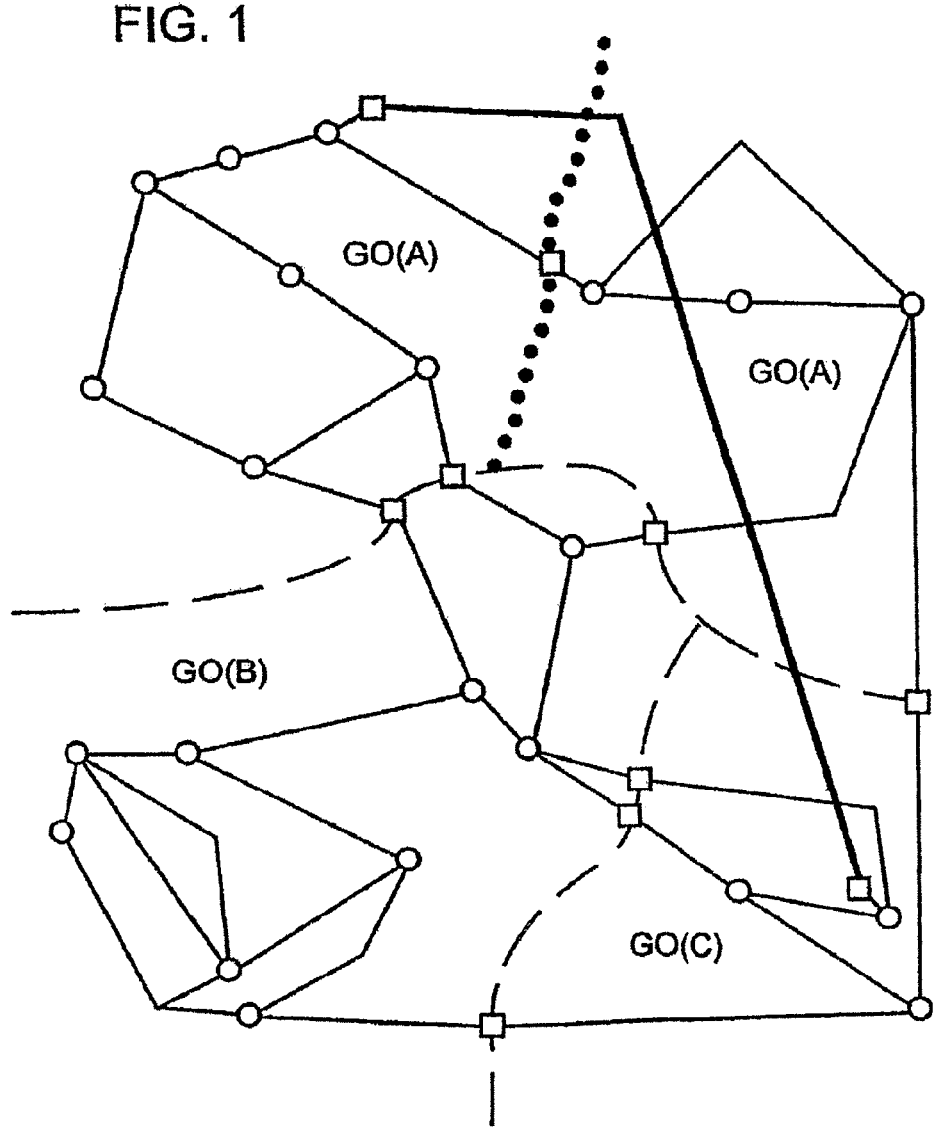
FIG. 1 is a map representation of an example dc-segmented transmission network.

FIG. 1 represents a simplified example of an ac network that has been segmented along the boundaries of three Grid Operators (GOs): GO(A), GO(B), and GO(C). GO(A) has also been segmented within its own area into two ac sectors. The heavy dashed lines indicate the GO boundaries and the dotted line the intra-sector boundaries for GO(A).

The light straight lines depict ac transmission lines which could be of differing voltage levels, for example 60 kV to 500 kV. The circular dots depict ac substations, which in turn, although not shown in FIG. 1, connect to various lower and higher voltage lines and to generators and loads. The square dots depict ac-dc stations including pairs of BTB converters and single ac-dc converters. The heavy dark line depicts a dc line between one of the GO(A) segmented areas and the GO(C) sector.

The four-sectors shown in FIG. 1 are asynchronous and have no ac interconnections of any type with each other including low voltage ac lines commonly used at distribution voltages for multiple load delivery points. Segmentation can be applied to ac networks ranging in size from a few thousand megawatts to very large ac grids such as the Western and Eastern Interconnections of North America which represent hundreds of gigawatts.

Flows between the asynchronous ac sectors are controlled entirely by the dc apparatus. The apparatus consists of the sets of dc links (i.e., dc converters and lines) between the sectors.

Figure 2:
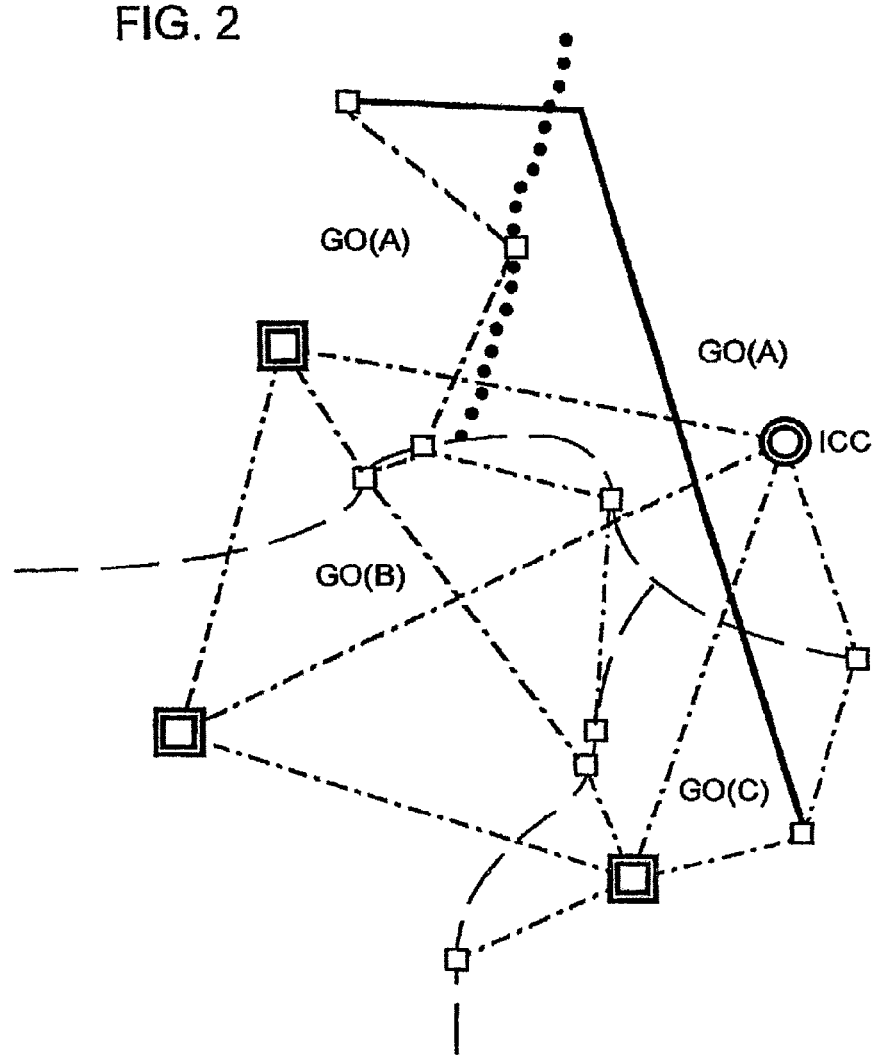
FIG. 2 is a map representation providing an overview of an example infrastructure for the network shown in FIG. 1.

FIG. 2 depicts operating centers for each of the GOs and for the dc interconnections. Each of these centers could consist of a central control headquarters as well as subordinate reporting centers. Communication links are shown as thin broken dashed lines. The links are for voice communications, data exchanges, monitoring, and system control purposes. Each sector's ac transmission network would be controlled by its GO. Neighboring GOs may jointly operate shared dc stations and lines. Alternatively, an interconnection coordination center (ICC) may operate the dc apparatus. Inter-sector trade schedules will be developed and enforced by the ICC only.

Typically all the equipment that together represents the ac and dc lines and interconnections would have multiple owners who would be required to operate the equipment under the direction of the GOs and the ICC, and who would receive revenues from the users and beneficiaries of the networks.

Figure 3:
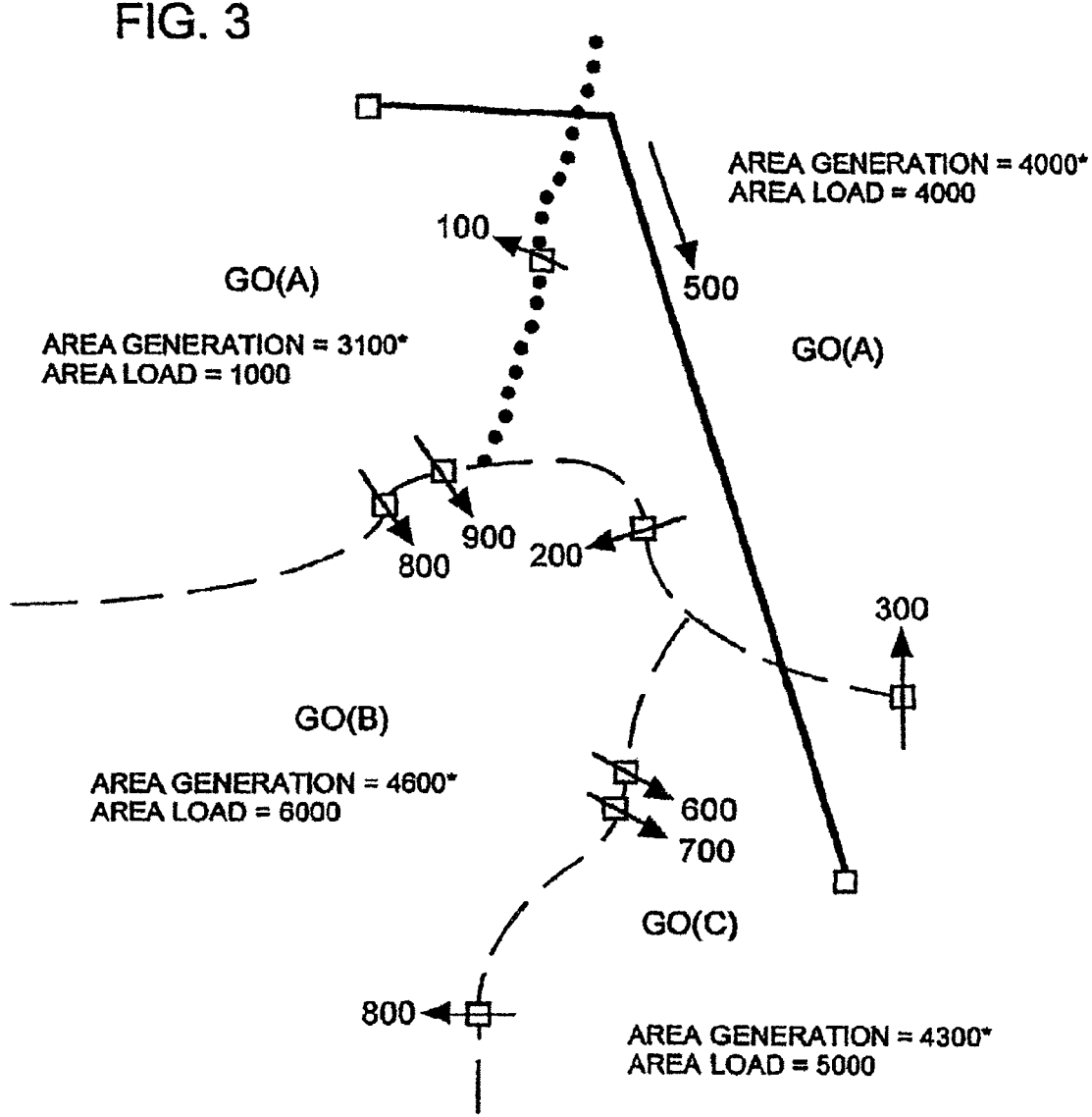
FIG. 3 is a map representation illustrating example loading of the network shown in FIG. 1.

FIG. 3 depicts a typical loading of the dc interconnection gates shown in FIGS. 1 and 2. Total generation (excluding for simplicity purposes reserve margin requirements and losses) and loads are indicated for each sector, as well as the power flows and direction of flow at each dc interconnection point.

Note that the flows between ac sectors are entirely determined by the inter-sector dc flows. A change in the flow at any one dc interconnection point may be matched by an increase in generation in one ac sector and a decrease in generation in the ac sector on the other side of the dc gate. Alternatively, the generation in each of the sectors involved can remain constant and the change in flow at one dc interconnection point is compensated by an opposite change in the flows at one or more dc interconnection points between the same two ac sectors. The ability to change flows through dc interconnection points while holding generation and loads in each ac sector constant demonstrates the liquidity possible through the application of dc gates. Liquidity is further increased by allowing for changes in both generation and dc gate flows.

II. Segmentation Design To Facilitate Efficient Market Operation

Segmenting an ac interconnection to facilitate efficient market operation would proceed along the steps identified in the process outlined in FIGS. 4 through 10. The process enables separating the costs incurred for market facilitation from the costs that could be allocated to reliability enhancement. Such separation is essential for proper capital allocation as well as transmission services pricing and rate setting applications, and hence for valuing and capturing reliability credit for investments aimed primarily at improving market-designs.

A. Market-Design Segmentation under Current Reliability Criteria

Designing to enhance market functions and operation requires segmenting the ac interconnection of interest at every ac tie between all pairs of bulk-power market regulation territories governed by distinct market tariffs. Meeting this requirement leads to the decomposition of the interconnection into ac sectors whose boundaries would coincide with the boundaries of the prevailing market tariffs. Each ac sector would be then operated under a distinct set of internally consistent market rules prescribed by the applicable tariff. The boundaries defining any sector would have to coincide with the collective jurisdictional territories of the interconnection's GO members assigned to the sector. A GO is any entity in charge of operating one or more transmission networks, such as vertically integrated utilities, federal power marketing agencies, independent transmission companies, independent system operators, regional transmission organizations, and other transmission service providers. A sector could be limited to a portion of the service territory of a single GO, or it could be as large as a combination of the control areas of several GOs. Because dc interconnection technology enables total control over the magnitudes and directions of inter-sector power flows, a sector may consist of a combination of non-contiguous ac networks.

Figure 4:
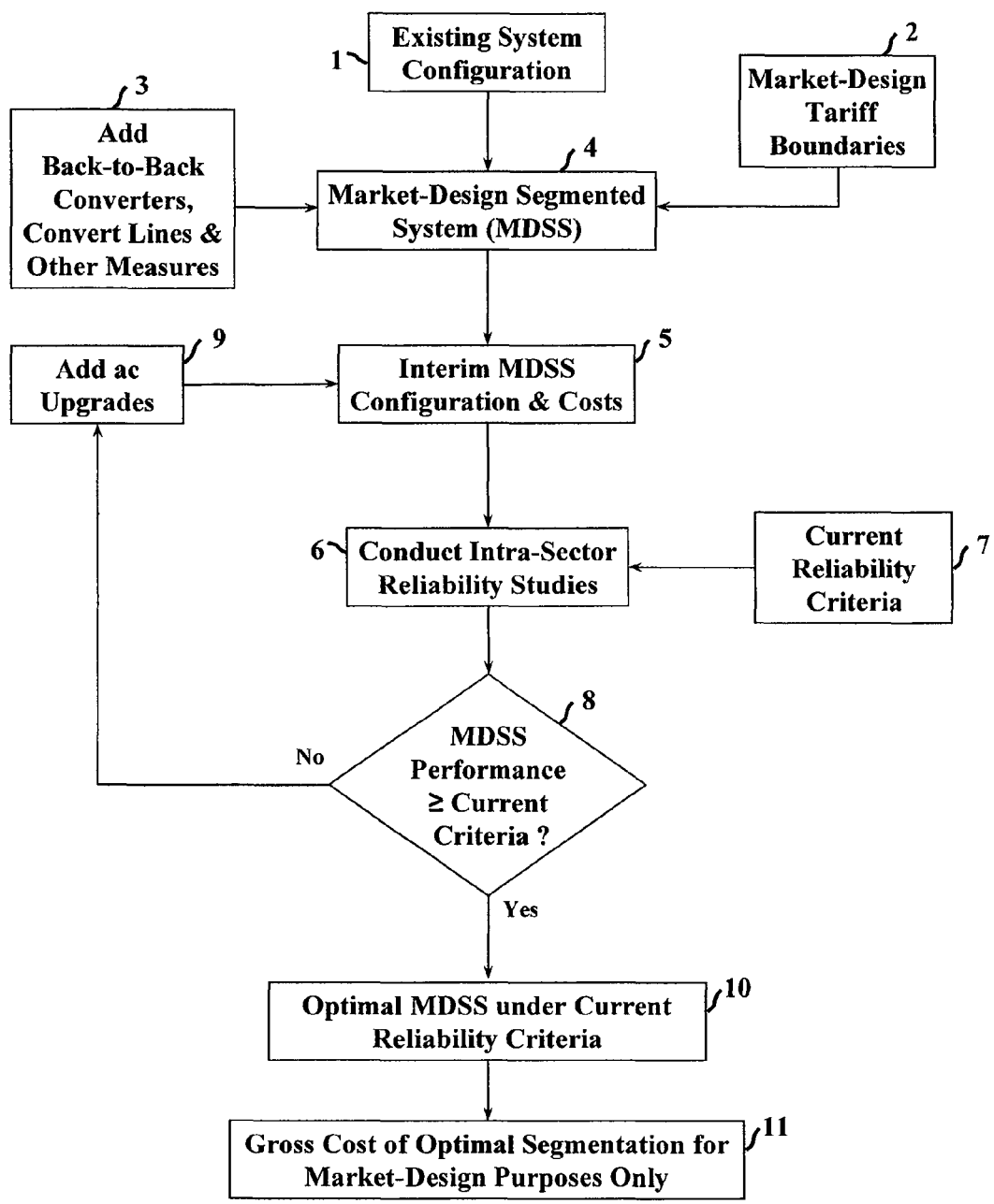
FIG. 4 is a flow chart of a process for optimal segmentation of an ac interconnection for market-design purposes only while meeting current reliability criteria and for determining the gross cost of such investment.

The design process starts in FIG. 4 by decomposing the existing configuration of the targeted ac interconnection 1 into a number of ac sectors using the desired tariff boundaries under the market-design of interest 2 and available segmentation tools 3. Thus, all transmission ties between the defined sectors would be identified and BTB converters would be installed on most (if not all of) the ac ties between neighboring sectors at already established tariff boundaries. In some cases, economic circumstances may favor ac-to-dc line conversions. In other situations, segmentation may render certain ties, particularly the low-voltage types, uneconomic to maintain and may have to be opened during at least normal operation. The desired mix of BTB, line conversions and ac tie deactivations would have to be determined through a collaborative effort between stakeholders in the neighboring sectors subject to applicable technical, economic and regulatory criteria.

The resultant configuration is an initial Market-Design Segmented System (MDSS) 4.

It is possible that one or more member service areas might experience reduced post-segmentation grid reliability performance due to internal (i.e., native) generation or transmission outages that would not be satisfactorily mitigated because of lack of synchronous ac support from neighboring systems. Therefore, the reliability performance of the MDSS may have to be evaluated by conducting intra-sector reliability studies 6 using currently applied reliability criteria 7. The analytic methods and software tools for carrying out the reliability studies 6 (including load flow simulations and system stability assessments) are well developed and commonly used. The results of the reliability performance assessment are contrasted with the current criteria 8. If the MDSS intra-sector reliability performance were found inadequate, a limited investment in intra-sector ac upgrades would be warranted 9. The costs of any incurred remedial ac upgrades may have to be paid for in full or partially by the ac interconnection members who fear degraded local service reliability after loss of synchronous ac support (since prior to segmentation they were in effect leaning on their neighboring ac systems without necessarily having in place contractual arrangements for such support). To the extent the intra-sector ac upgrades are not paid for by the primary beneficiaries in the affected sectors, the costs of the initial MDSS would have to be updated 5. Alternatively, the costs of ac upgrades could be tracked and recovered separately as intra-sector reliability support charges. Although the ultimate allocation of the costs of intra-sector upgrades may have to be determined through negotiations, the algorithm laid out in FIG. 4 provides an essential piece of information: the shadow price of maintaining the equivalent of the pre-segmentation synchronous support commonly exchanged among interconnected ac networks. No meaningful negotiation could proceed without this type of information.

Once the MDSS performance is deemed adequate from a current reliability criteria perspective, an optimal MDSS is established 10. The attained design does not take account of the value of reliability improvements beyond the requirements of current reliability criteria. The result is the Gross Cost of Optimal Segmentation for Market Design Purposes Only 11.

B. Market-Design Segmentation under Full Dynamic Security

Because only dc current is permitted to flow through dc gates, ac disturbances will be prevented from propagating between ac sectors. Of special interest here is the potential reduction of the frequency and severity of a very costly type of ac disturbances; namely, interconnection or grid-wide cascading outages triggered by a certain class of initiating events. Cascading outages could lead to significant loss of loads and generation, and possibly system collapse. Gates installed for market-design enhancement purposes will block outages from propagating between sectors. However, problems may persist within individual sectors. Moreover, gates are not 100 percent reliable (due to normal failures or potential acts of sabotage or vandalism). In other words, there will always be a residual risk of cascading outages. In the case of segmentation projects limited to market enhancement, such risk may not be negligible. Policy makers may opt to eliminate or substantially reduce the residual risks of cascading outages by developing and enforcing new planning and operating criteria that could lead to the use of dc gates and associated technology beyond the needs of purely market-design projects. These criteria are new because they would address reliability issues above and beyond current industry practices.

Their nature and specifics are subject to policy decisions to be undertaken by governments and regulators in consultation with the power industry. The new criteria can be either a set of performance standards targeted at reducing or even substantially eliminating the incidence and severity of cascading outages, or an economic criterion (e.g., the requirement that the incremental cost of segmenting the grid would not exceed the incremental benefit of reducing the expected costs of residual cascading outages).

Figure 5:
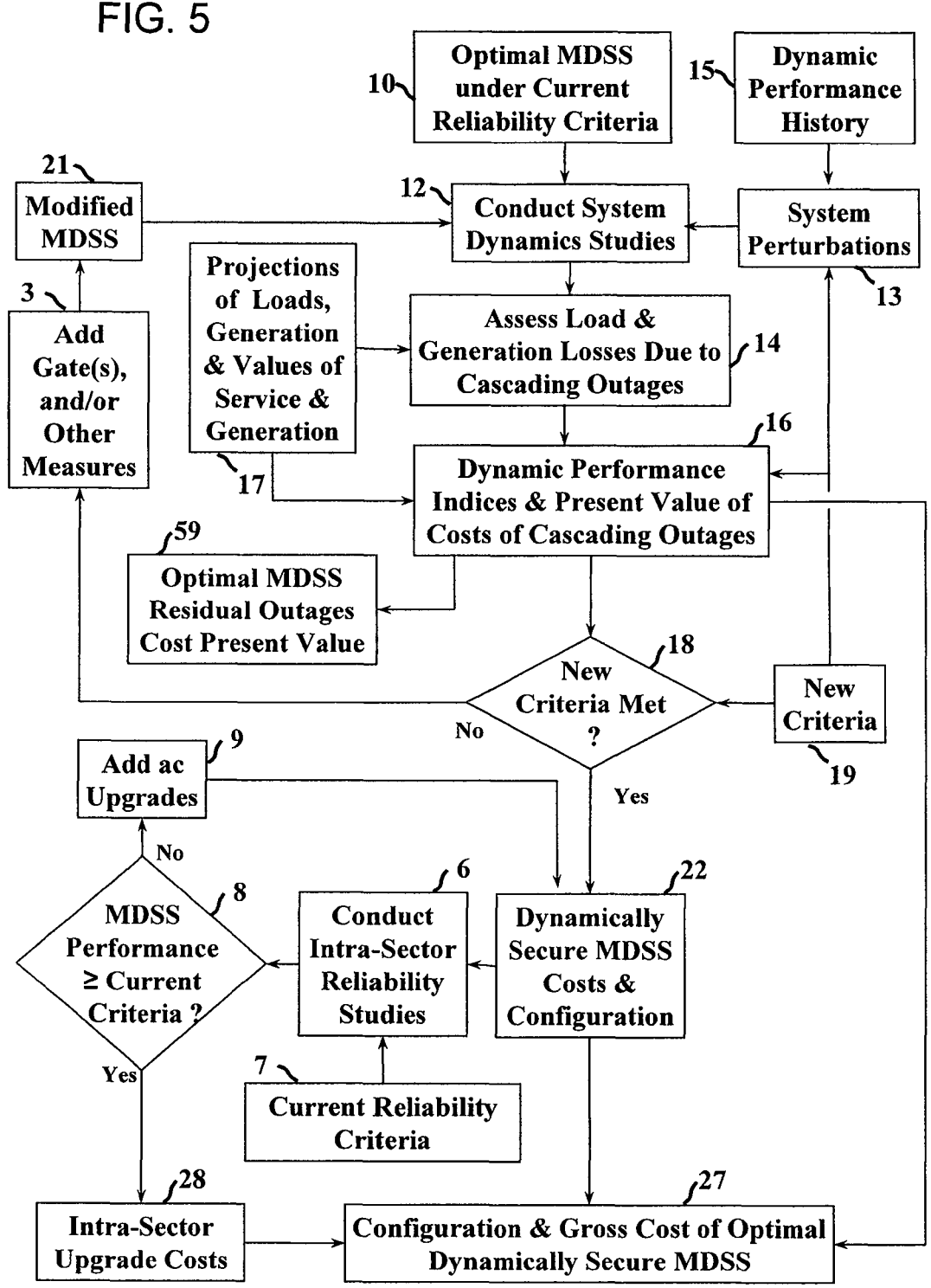
FIG. 5 is a flow chart of a process for identifying the configuration and costs of segmenting for market-design under both current and new (cascading outages) reliability criteria (including gross investment cost and the present value of cascading outage costs).

FIG. 5 shows how an optimal MDSS configured specifically and only for market-design purposes could be further developed to meet new (cascading outages) criteria. The process exhibited transforms a segmentation project designed to enhance market operations into a dynamically secure (i.e., sufficiently impervious to cascading outages) MDSS. It starts with a multi-pass assessment of the system dynamics of the segmented grid each time the grid is modified for better containment of cascading outages. In the first step of the multi-pass evaluation, the dynamic performance of the MDSS 10 is evaluated by conducting system dynamics studies 12 using a comprehensive set of perturbations 13 designed to test and evaluate the dynamic response of the interconnection.

A system perturbation is an event or a contingency capable of initiating cascading outages. An initiating event consists of the involuntary (unscheduled) removal from service of two or more elements of one or more of the following system component categories: (i) generating units, (ii) intra-sector transmission facilities (e.g., common towers, ties on common rights-of-ways, and circuit breakers), and (iii) inter-sector dc transmission equipment including dc gates and dc ties. The list of vulnerable elements must extend beyond the existing infrastructure to include all equipment additions, upgrades and retirements to be undertaken over the planning horizon of interest. Initiating events can be either normal contingencies or the result of acts of vandalism or sabotage. Normal initiating contingencies are caused by a combination of mechanical failures due to wear and tear or weather-related causes, and, or human (operator) errors. Acts of vandalism and sabotage could be of the limited (localized) variety or in the form of coordinated attacks on the grid, and may emanate from domestic or international sources. Whether normal or not, the list of system perturbations 13 must be comprehensive in that it should include all credible events that could initiate cascading outages. However, new planning and operating criteria 19 implemented to mitigate the impacts of residual cascading outages could very well dictate the scope of the selection of the initiating events 13. Algorithms for identifying and ranking initiating events have been developed and can be modified to prepare the required data set 13.

In conducting the system dynamics studies 12, the set of perturbations 13 is to be applied using Monte Carlo simulation techniques to mimic the random arrival of the initiating events in consistent (non-overlapping) queues. (Other less rigorous techniques could also be employed. However, there is risk that using alternative methods may lead to excessive reliance on subjective expert opinion.) The duration and frequency of the simulated contingencies have to be based on the performance history of the elements involved and the expected changes in the configuration of the grid. Potential acts of vandalism and sabotage would have to be accounted for through vandalism and sabotage (security) simulation scenarios.

In addition to using Monte Carlo routines to simulate the arrival of initiating contingencies, the system dynamics studies 12 would involve the application of well-established software tools for conducting power flow simulations and stability analyses. The primary results of the system dynamics studies 12 include detailed accounts of the performance of the segmented interconnection in face of the initiating events incurred during each simulation run. These accounts would specify the observed voltage and frequency excursions, the amounts, durations and circuit locations of load service interruptions, and the dropped generation associated with each initiating contingency.

Using projections 17 of future patterns of loads growth and distribution and of generation production over the adopted planning horizon, the information produced by the system dynamics studies 12 is processed for each simulation run into forecasts 14 of: (i) load service outages, and (ii) generation drops. In the case of load losses, using load growth and distribution projections by geographic location and class of service 17, the results of the system dynamics studies 12 can be translated into service interruptions in megawatt-hours of dropped loads by customer class-of-service, time of day and the utility providing the power 14. Generation drops information 12 can also be detailed into plant outage schedules, including shutdown and recovery requirements 14 with input from generation projections 17.

Using customers' value-of-service (VOS) projections 17, the loss-of-load impacts of cascading outages 14 are translated into expected present values of cascading outage costs 16. VOS inputs can be obtained through consumer survey techniques complemented by historic costs of loss-of-service due to cascading outages. Present values of lost generation 16 can be computed by combining projections of disconnected generation 14 with value of generation (VOG) forecasts 17. VOG data can be obtained from wholesale-price projections generated by production costing models and, or market-based forecasts.

The present value computations would be carried out over the required number of Monte Carlo simulations to produce expected value projections 16 of the worth of load and generation losses. The number of simulations needed depends on the method used to economize on computational efforts (e.g., importance sampling). Equations (1) and (2) provide simplified expressions for calculating the present values of load and generation losses in 16 on the basis of information from 14 and 17:

$$PVCOCLL = \frac{1}{R}\sum_{r=1}^{R}\left[\sum_{t=1}^{T}\left(\frac{\sum_{i=1}^{I}\sum_{c=1}^{C} COLL_{i,c,t} \cdot VOS_{c,t}}{(1+DR)^t}\right)\right] \quad (1)$$

$$PVCOCLG = \frac{1}{R}\sum_{r=1}^{R}\left[\sum_{t=1}^{T}\left(\frac{\sum_{i=1}^{I}\sum_{g=1}^{G} COLG_{i,g,t} \cdot VOG_{g,t}}{(1+DR)^t}\right)\right] \quad (2)$$

Where:
PVCOCLL=Present value of cascading outage costs of lost load, $
PVCOCLG=Present value of cascading outage costs of lost generation, $
R=Number of Monte Carlo simulation runs
r=Monte Carlo run index
T=Number of periods of simulated system operation
t=Time step (period) of system operation
DR=Discount rate per time-step t
I=Number of simulated initiation events
i=Initiating event index C=Number of customer classes
c=Customer class index
G=Number of generating facilities exposed to cascading outages
g=Generating unit index
$COLL_{i,c,t}$=Cascading outages load loss caused by event i among customers class c at time t
$COLG_{i,g,t}$=Cascading outages lost generation inflected by event i on generator g at time t
$VOG_{g,t}$=Value of generation from generator g at time t
$VOS_{c,t}$=Value of service for customer class c at time t Along with the load and generation losses associated with simulated residual cascading outages, expected values of system performance indices can be derived in 16 from load and generation data projections 17, and load and generation loss accounts 14. Even though the number and nature of the indices to be used for segmented networks are yet to be determined (most likely by policy makers and regulatory bodies), the concept has been used by the industry for all phases of the power generation and delivery cycle. It is important to note that the desired indices must be compatible with the adopted planning (new) criteria 19 for mitigating cascading outages.

In 16, the present value results of the first round represent the costs of residual cascading outages that the optimal MDSS could not block. This information is passed as Step 59 of the part of the process dedicated to identifying the dynamically significant gates in the optimal MDSS configuration. (See FIG. 8.)

In 18 the current level of segmentation is tested against the adopted new criteria 19. Because the criteria 19 could be in the form of either a set of performance standards (thresholds) or an economic objective or both, the testing in 18 has to be flexible. Specifically, depending on the preferred design policy, one or both of the following tests can be made in 18: (i) ascertain whether the expected values of the performance indices in 16 meet the new criteria 19, and (ii) determine whether the present value of the current incremental increase in grid segmentation costs exceeds the present value of the costs of reduced residual cascading outages from 16. If the answer to the applicable test(s) is yes, a dynamically secure market-design segmented system has been attained 22 and no further segmentation would be needed. If the answer is no, the new criteria have been violated and additional segmentation 3 of FIG. 4 is required.

In 3 of FIG. 4, the system is segmented further by adding one or more gates or undertaking other measures (such as the opening of ac ties for normal operation). This action leads to splitting of at least one sector into two or more sectors. The result is a modified MDSS 21. The new design 21 is then subjected to its own round of system dynamics studies 12 as described earlier. The evaluation process is repeated using Monte Carlo simulation techniques to verify compliance with the new criteria. If the answer is again no, the grid is segmented further and the rest of the steps are performed. The process continues until compliance is affirmed. The final result at this point is a complete specification 22 of the configuration, capital and O&M costs, costs of the ultimate residual cascading outages (if any), and the performance of a market-enhancement design capable of meeting new (cascading outages) reliability criteria.

As in the case of segmenting for market-design purposes only (FIG. 4), it is possible that one or more member service areas could experience reduced grid reliability performance because of intra-sector generation and, or transmission outages after additional segmentation is performed on the MDSS. Such situation can be dealt with in the same manner outlined in Section A (FIG. 4). The process starts with an evaluation of the intra-sector reliability performance of the dynamically secure MDSS 22 by conducting the appropriate intra-sector reliability studies 6 using currently applied reliability criteria 7. The studies 6 to be carried out include traditional load flow simulations and system stability assessments. The results of the assessment are then compared 8 with the current reliability criteria 7. If intra-sector reliability performance were found inadequate, intra-sector ac upgrades would be introduced 9. To the extent the ac upgrades are not paid for by the primary beneficiaries in the affected sectors, the costs of the dynamically secure MDSS would have to be updated 22. Alternatively, the new costs could be tracked and recovered separately as intra-sector reliability support charges. Again, the ultimate allocation of the costs of intra-sector upgrades may have to be determined through negotiations. The algorithm laid out in FIG. 5 provides the means for estimating the shadow price of maintaining the equivalent of the pre-segmentation synchronous ac support commonly exchanged among interconnected ac networks.

The incremental adjustment and assessment of intra-sector reliability performance is repeated until the adequacy of system design is established at 8. Once this is accomplished, intra-sector upgrading costs are then tallied into total estimates of the additional costs to be incurred 28. The results 28 are then added to the costs of the dynamically secure MDSS 22 to provide a gross estimate 27 of the cost of segmenting an interconnection for market purposes as well as to secure the grid against most (if not all) cascading outage events while meeting current (local) planning and operating reliability criteria. Note that 27 also conveys (from 16) the present value of the costs associated with residual cascading outages determined by the last round of system dynamics studies.

C. Segmenting for Reliability Only

Investing in grid reliability differs from market enhancements with respect to: (i) how project costs are allocated, and (ii) the achievable level of economy of scale savings.

First, regarding cost allocation, unlike market-design enhancements, protecting the public from cascading outages is a "common good" service benefiting all transmission system members of the interconnection to be segmented, and therefore the costs of such reliability service can be arguably rate-based (i.e., incorporated into customer retail rates by regulatory decree) over the entire interconnection. In the case of market enhancement, project costs cannot be rate-based on an interconnection-wide basis since the benefits might be limited to a single GO, and in some cases to a few generators or even a single supplier. As most projects affect both reliability performance and market operations, the subject of sorting out and properly allocating the costs and benefits of transmission investments has been and still is an area of intense research and debate. The invention at hand addresses this issue directly and presents a novel and robust methodology for resolving this matter in relation to interconnection-wide segmentation of electricity grids. The principles underlying this methodology are also applicable to ac investments affecting both reliability and market performance including flexible ac transmission systems (FACTS) projects.

Second, reliability investments could involve different economy of scale. For example, segmenting an interconnection with multiple regulatory market jurisdictions to minimize cascading outages may require much fewer gates than partitioning it for market-design purposes only. Since the price of an installed gate for any segmentation investment is likely to be very sensitive to the sizes and number of gates to be acquired for the project as a whole, there is bound to be two perspectives on how much an installed gate should cost: (i) a reliability-based estimate, and (ii) a market-enhancement value. Therefore, any assessment of a credit for reducing or eliminating cascading outages in the form of an avoided investment-cost of dc gates (as a by-product of a market-design segmentation project) must be evaluated from a purely reliability investment perspective in addition to a market-based approach.

This part of the design process achieves two objectives: (i) it establishes the basis for estimating the costs of segmenting the ac grid to only eliminate or minimize the impacts of cascading outages, and (ii) it identifies the gates needed for minimizing or even eliminating cascading outages. The results of achieving the first objective can be translated into avoided-cost credits—from a strictly reliability investment perspective—as compensation for the contribution(s) of market-design segmentation schemes to dynamic performance improvement. Accomplishing the second objective will facilitate the identification of the dynamically significant market-design gates.

Figure 6:
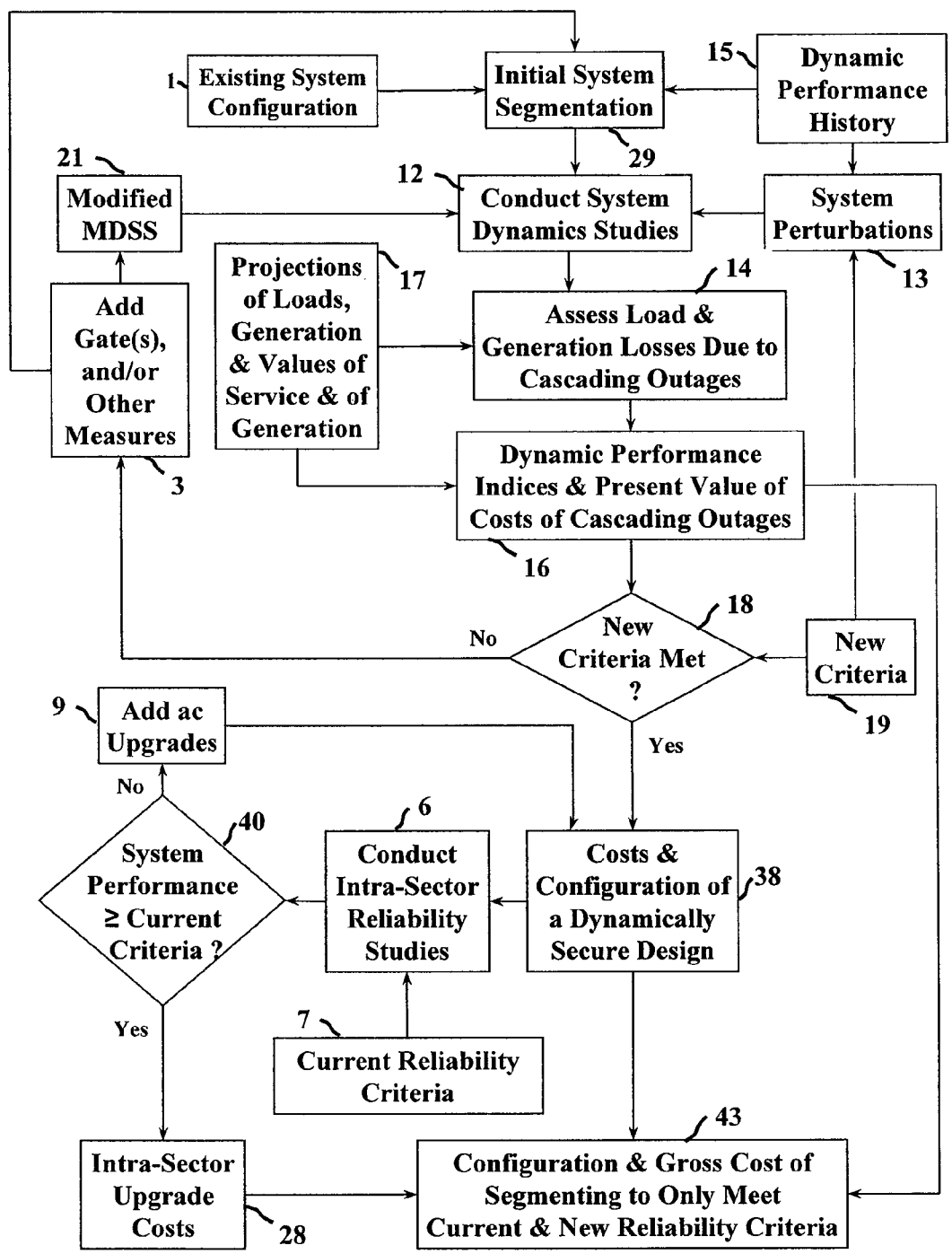
FIG. 6 is a flow chart of a process for determining the configuration and gross cost of segmenting for reliability purposes only under both current and new (cascading outages) reliability criteria.

As detailed in FIG. 6, the process for segmenting an ac interconnection to only enhance reliability performance is very much similar to the one developed for transforming a market-oriented segmentation project into a dynamically secure grid (i.e., FIG. 5). The only differences between the two are the starting points and the end products. In the case at hand, the process starts at 1 with the configuration and performance parameters of the existing grid of the ac interconnection of interest and ends with a segmented system that meets all current and new (dynamic performance) reliability criteria (FIG. 6). In the case of FIG. 5, the starting point is the MDSS and the end product is a dynamically secure market design.

Guided by the known history of the dynamic performance of the ac interconnection 15, the existing ac grid 1 is decomposed into an initial system design 29 consisting of a number of asynchronous ac sectors by inserting BTB converters at strategic locations on certain ties, and possibly by converting some inter-sector ac ties and opening other ac ties for normal operation 3.

The initial design 29 is then subjected to a multi-pass evaluation of its dynamic performance each time the grid is incrementally segmented until certain criteria for containing cascading outages are met. In the first step of the multi-pass assessment, the performance of the initial design 29 is evaluated by carrying out system dynamics studies 12 using a set of perturbations 13 representing all credible events that could initiate cascading outages. The perturbations used here differ only slightly from those applied to the MDSS in FIG. 5 in that the set of segmentation equipment (e.g., gates) failures and outage scenarios are not going to be the same. New planning and operating criteria 19 for mitigating the impacts of residual cascading outages could determine the scope of the initiating events 13. Again, algorithms for identifying and ranking the initiating events have been developed and can be modified as needed for 13.

It is best to apply the perturbations 13 using Monte Carlo simulation techniques to mimic the random incidence of the initiating events in non-overlapping queues. The simulated contingencies have to be based on the performance history of the grid elements involved and the expected changes in the configuration of the interconnection. The incidence of potential acts of vandalism and sabotage would have to be represented through security simulation scenarios.

The system dynamics studies 12 would also involve the use of traditional tools for conducting power flow and stability analyses. The primary results of 12 include detailed accounts of the dynamic performance of the segmented grid after the incidence of an initiating event during each simulation run. The accounts would specify all observed consequences of every simulated initiating contingency such as voltage and frequency excursions, the amounts, durations and circuit locations of load service interruptions, and disconnected generation events.

Using loads growth and distribution projections 17 and generation production forecasts over the assumed planning period, the results of the system dynamics studies 12 are processed for each Monte Carlo run into forecasts 14 of: (i) load service interruptions, and (ii) generation disconnects. Using load growth and distribution projections by location and class of service 17, the results of the dynamics studies 12 can be transformed into service outages in megawatt-hours by customer class-of-service, time of day and the utility supplying the power 14. With input from generation projections 17, generators disconnection information from 12 can be translated into plant outage schedules 14.

Using VOS projections 17 and the loss-of-load impacts of cascading outages 14, the expected present values 16 of cascading outage costs are then calculated. VOS data can be obtained through customary consumer surveys complemented by historic data on the costs of unscheduled loss-of-service due to cascading outages. Present values of lost generation 16 can be derived by combining disconnected generation projections 14 with VOG forecasts 17. VOG data can be obtained from long-term projections of wholesale prices generated by production costing models and, or market-based forecasts.

The expected value projections 16 of the worth of load and generation losses would be computed over the needed number of Monte Carlo simulations (determined by the method used to economize on computational efforts). Equations (1) and (2) provide simplified formulas for estimating the present values of load and generation losses in 16 on the basis of results from 14 and 17.

Expected values of system performance indices can be calculated in 16 using load and generation projections 17, and load and generation loss accounts 14. The number and nature of the indices to be used for segmented networks would be determined, most likely, by policy makers and regulatory bodies. The industry has used performance indices for all phases of the power generation and delivery cycle. For segmentation purposes, the desired indices must be compatible with the adopted new criteria 19.

In 18, the current level of segmentation is tested against the new criteria 19. Depending on the chosen design policy, one or both of the following tests can be used in 18: (i) determine whether the expected values of the performance indices of 16 meet the applicable new criteria 19, and (ii) establish whether the present value of the costs of the last incremental increase in grid segmentation exceeds the present value of the costs of reduced residual cascading outages from 16. If the answer to either or both questions is yes, a dynamically secure design has been attained 38 and no further segmentation would be needed. If the answer is no, the new criteria have been violated and additional segmentation 3 is needed.

In 3, the system is further segmented by adding one or more gates or implementing other measures (e.g., opening ac ties for normal operation). This leads to the bifurcation of at least one sector into two or more sectors and hence into the modified design 21. The new design 21 is then subjected to its own round of system dynamics studies 12 and the assessment process is repeated using Monte Carlo simulation to determine compliance with the new criteria. If the answer is again no, the grid is segmented further and the testing repeated. The process continues until compliance is established. The outcome at this point is a complete specification 38 of the configuration, capital and O&M costs, costs of the ultimate residual cascading outages (if any), and the performance of a segmentation design capable of meeting new (cascading outages) reliability criteria.

The next steps in the design process are to assess the need for and the costs of implementing intra-sector upgrades to compensate for any loss of interconnection ac support due to grid segmentation. This is accomplished by first evaluating the intra-sector reliability performance of the dynamically secure design 38 by carrying out the appropriate intra-sector reliability studies 6 using currently applied reliability criteria 7. The studies 6 to be conducted include traditional load flow and system stability analyses. The results of 6 are compared at 40 with the current reliability criteria 7. If reliability performance were found inadequate, intra-sector ac upgrades would be implemented 9. To the extent the ac upgrades are not paid for by the primary beneficiaries, the costs of the dynamically secure design in 38 would have to be updated. Otherwise, the new costs could be recorded and recovered separately as intra-sector reliability support charges. The allocation of the costs of intra-sector upgrades may have to be decided through negotiations. The algorithm of FIG. 6 provides the means for determining the shadow price of maintaining the equivalent of the pre-segmentation synchronous ac support commonly exchanged among interconnected ac networks.

The incremental enhancement and evaluation of intra-sector reliability performance is repeated until the adequacy of system design is ascertained at 40. Once this is achieved, intra-sector upgrading costs are tallied into total estimates of the additional investment to be undertaken 28. The results of 28 are then added to the costs of the dynamically secure design 38 to yield a gross cost, in 43, of segmenting an interconnection to only secure the grid against most (if not all) cascading outage events while meeting current (local) planning and operating reliability criteria. Note that 43 also provides through 16 the final set of performance indices and the present value of residual outages for the reliability-design project.

D. Assessing the Dynamic Performance of the ac Interconnection without Segmentation Because dc gates installed for market-enhancement segmentation projects can block the propagation (cascading) of outages between sectors, such investments could be eligible for reliability credits. This type of benefit could be essential for rendering capital-intensive projects economically justifiable. Estimating a reliability credit for a market-oriented segmentation investment requires identifying the gates that would contribute to service reliability improvements as well as the customers' savings associated with the achievable reduction in cascading outage impacts. This in turn necessitates establishing a status quo benchmark for: (i) evaluating the dynamic performance of the segmented grid, and (ii) identifying the gates that would contribute to reducing grid exposure to inter-sector cascading outages. The required benchmark is structured as a baseline forecast of the dynamic performance of the grid in the absence of segmentation over an agreed upon planning horizon. The forecast would consist of a set of mutually consistent baseline projections of future cascading outages and associated costs for the unsegmented ac interconnection of interest.

Figure 7:
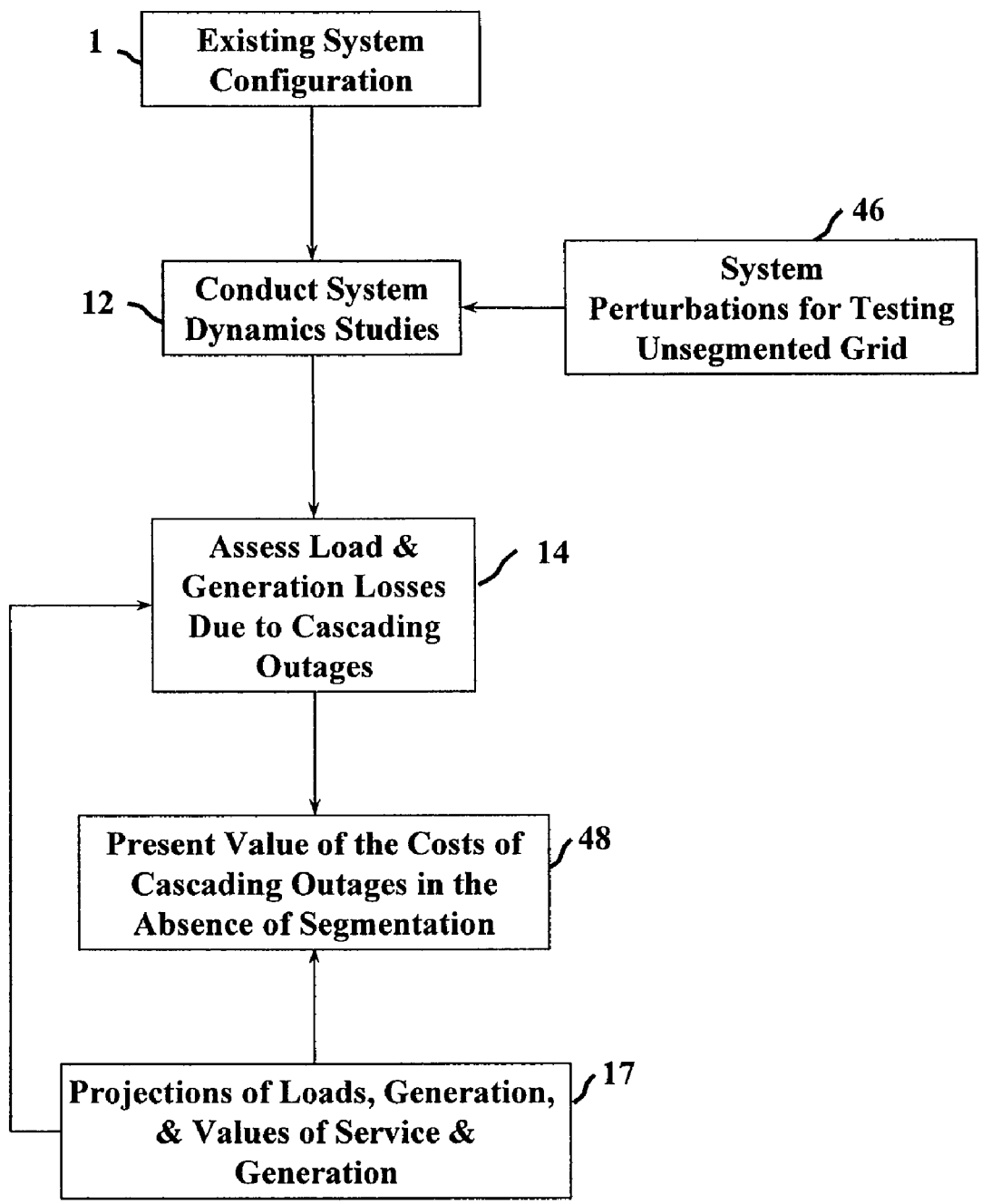
FIG. 7 is a flow chart of a process for assessing the dynamic performance of the ac interconnection in the absence of segmentation to determine the present value of the costs of cascading outages without segmentation.

Assessing the dynamic performance of the unsegmented grid begins at 1 in FIG. 7. Here, the configuration of the generation and transmission systems, as well as future load growth and distribution patterns are specified at levels of detail that would enable conducting the necessary system dynamics studies over a multi-year planning horizon. The needed information includes among other things adopted (consensus) forecasts of customers' loads, and expected generation additions, upgrades and retirements, and planned transmission investments (excluding of course segmentation projects).

The dynamic performance of the unsegmented grid 1 is evaluated by conducting system dynamics studies 12 using a comprehensive set of perturbations 46 designed to test and evaluate the dynamic response of the ac interconnection. The perturbations to be used in this part of the design process differs from those to be applied in designing fully secure market-focused projects (i.e., 13 in FIG. 5) and reliability-focused segmentation investments (i.e., 13 in FIG. 6) in that the initiating events represented by the perturbations to be simulated 46 do not include failure modes for dc gates and related segmentation equipment. Other than this exception, the list of vulnerable grid elements and the associated candidate initiating events must extend beyond the existing infrastructure to account for facility additions, upgrades and retirements to be undertaken over the planning horizon of interest, and therefore it should match those of FIGS. 5 (at 13) and 6 (at 13). Algorithms for identifying and ranking initiating events are available.

In conducting the system dynamics studies 12, the set of perturbations 46 is to be applied using preferably Monte Carlo simulation methods to mimic the random arrival of the initiating events in consistent queues. The duration and frequency of the simulated contingencies have to be based on the performance history of the grid elements involved and the expected changes in the configuration of the generation and transmission systems comprising the ac interconnection. The incidence of vandalism and sabotage would have to be accounted for through vandalism and sabotage (security) simulation scenarios.

The system dynamics studies 12 would also involve the application of well-known software products for conducting power flow studies and stability analyses. The main results of 12 include annual records of the performance of the unsegmented interconnection in response to the initiating events incurred during each simulation run. These records would specify the observed voltage and frequency excursions, the amounts, durations and circuit locations of lost loads, and the disconnected generation associated with each initiating contingency.

The data generated by the system dynamics studies 12 is processed into forecasts 14 of load and generation losses caused by cascading outages during each simulation run. The load-loss forecasts in 14 would combine load growth and distribution projections (by geographic locations and class of service) 17 with the results of the system dynamics studies 12 to specify the details of the projected impacts, including the megawatt-hours of dropped loads by customer class-of-service, time of day and the utility providing the power. Detailed generation-loss forecasts can also be assembled by combining generation projections from 17 with generation-outage results from 12.

The loss-of-load and generation impacts of cascading outages in 14 are translated into an expected present value of the costs 48 to consumers of cascading outages in the absence of grid segmentation using VOS projections from 17. The VOS data can be generated through scientific customer surveys, complemented if necessary by historic information on economic losses caused by unscheduled loss-of-service episodes. The present value of lost generation can also be computed and passed on to 48 in a similar manner by combining projections of generation losses with VOG forecasts from 14 and 17, respectively. VOG data can be obtained from long-term wholesale energy prices generated by production costing models and, or market-based forecasts. Equations (1) and (2) provide simplified expressions for calculating the present values of load and generation losses in 48 on the basis of information from 14 and 17.

E. Identifying Dynamically Critical Gates in a System Segmented for Market Design Only The objectives of this part of the process are: (i) to identify those dc gates that could be deemed actual contributors to preventing or lessening the incidence and, or severity of cascading outages; (ii) to quantify the costs of acquiring, operating and maintaining the identified gates; and (iii) to assess the monetary value of avoided service interruptions and averted blackouts because of segmentation-induced reductions in the frequency, duration and severity of cascading outages.

Identifying the dynamically significant gates is an essential step for valuing and establishing a reliability benefit credit for market-driven segmentation projects. The multi-pass process of FIG. 8 starts with the configuration of the optimal MDSS in 10. Using as a guide information about the locations of the gates for a reliability-focused segmentation of the interconnection 43, a modified MDSS 21 is created by taking out one or more gates and, or by closing normally opened inter-sector ac tie(s) 49.

The modified design is then subjected to system dynamics studies 12. The information needed for the studies includes: (i) a set of system perturbations 46 designed to evaluate the dynamic response of the interconnection and the interconnection's ability to minimize the consequences of a wide range of disturbances; and (ii) sufficient specification of the grid whose dynamic performance is to be evaluated. The first need is to be met by adjusting the optimal MDSS information base 10 to accommodate all changes introduced at 49. The perturbations 46 to be applied should be the same as the set used to evaluate the dynamic performance of the unsegmented version of the grid (FIG. 7).

The results of the first-pass studies at 14 will provide a measure of the dynamic performance of the modified MDSS 21 in terms of amounts of loads dropped and generation disconnected because of incurred outages. These projections are derived by combining the information generated in 12 about load and generation outage events with forecasts 17 of future loads (by service area and customer classes) and facility-specific production expectations. The results 14 are then translated into forecasts 16 of the present value of the costs associated with residual (unblocked) cascading outages using VOS and VOG projections 17. The method for calculating the present value estimates is the same as described for the case of the unsegmented system (14, 16 and 17 in FIG. 5, and Equations 1 and 2). Projections of dynamic performance indices can also be generated in 16 on the basis of load and generation outlooks 17 forecasts and simulated outage losses 14.

In 55, the modified system's dynamic performance is compared with the response of the unsegmented ac interconnection 48 to the same set of perturbations. The performance of the unsegmented grid 48 is obtained through the steps depicted in FIG. 7. If 55 indicates superior performance of the modified system, one or both of the following actions is taken: (i) one or more gates are removed from the grid; and (ii) one or more opened ac ties are restored for normal operation 49. The dynamic performance of the modified MDSS 21 is then evaluated again 12 using the set of perturbations 46. Steps 14, 16 and 55 are subsequently implemented to appraise the system's performance relative to the unsegmented (status quo) grid, and further adjustments are made by way of 49 if needed. The modification and evaluation of the segmented system is repeated until its performance is no better than that of the unsegmented grid. The incremental removal of gates and other segmentation measures and the subsequent assessment of the dynamics of the modified systems should reveal the significance of the contribution of the disabled market-design features in containing system-wide disturbances.

Making certain that the dynamic performance of the partially segmented grid is not superior to its unsegmented counterpart does not guarantee that it would not perform worse. Steps 56 and 57 are to ensure that the dynamic performances of the modified segmented system 21 and the unsegmented version of the grid 1 (in FIG. 7) are comparable. This is accomplished by adding incrementally a gate, opening an ac tie and, or introducing ac upgrades at the proper location(s). The modified MDSS is then tested and its dynamic response is evaluated against the performance of the unsegmented grid. If the response of the modified MDSS improves beyond that of the unsegmented grid, the inner loop 55 to 49 to 21 is performed. If comparable performance is not achieved, the outer loop 56 to 57 to 21 is executed. The purpose of the second loop is to ascertain that the dynamic performance of the modified segmented system would not be worse than in the absence of any level of segmentation. In both loops, the grid performance comparisons could be carried out using the outage-costs present value results and, or performance indices. Note that in cases where the number of gates is very large and gate costs are highly diverse, the use of rigorous nonlinear optimization techniques might be necessary for identifying the least-cost set of dynamically critical gates. Such optimization techniques are well established. The ultimate result of this part of the FIG. 8 design process is a fully specified, partially segmented system 58 whose dynamic performance would be comparable to the performance of the status quo (i.e., the unsegmented version of the grid over the planning time horizon of interest) 1 (in FIG. 7).

Contrasting the configurations of the partially segmented system of 58 and of the optimal MDSS 10 will reveal the identities and locations of the dynamically critical dc gates 60. The combined present value of the costs of acquiring, operating and maintaining the identified gates is then established at two levels: a low estimate based on the costs of full segmentation of the grid and a high value based on an investment commitment limited to the subset of gates deemed important contributors to mitigating cascading outages. The difference between the two estimates should reflect the importance of the effects of economy of scale on the costs of dc gates. Needless to say, the smaller the set of dynamic gates is relative to the investment needed for market design purposes, the greater would be the effects of economy of scale on the difference between the two estimates. It should be noted that the low value is likely to be supported by consumer advocates who wish to minimize rate-basing any part of an investment targeted at facilitating bulk-power markets. The high estimate reflects the cost that would have been incurred by ratepayers in implementing the critical set of gates that has accomplished the observed reduction in the costs of cascading outages. Sponsors of segmentation for market enhancement purposes would be in favor of using the higher value as a reliability credit to be netted out of the cost of their investment. The value that will be ultimately used will probably be determined through negotiations.

Figure 8:
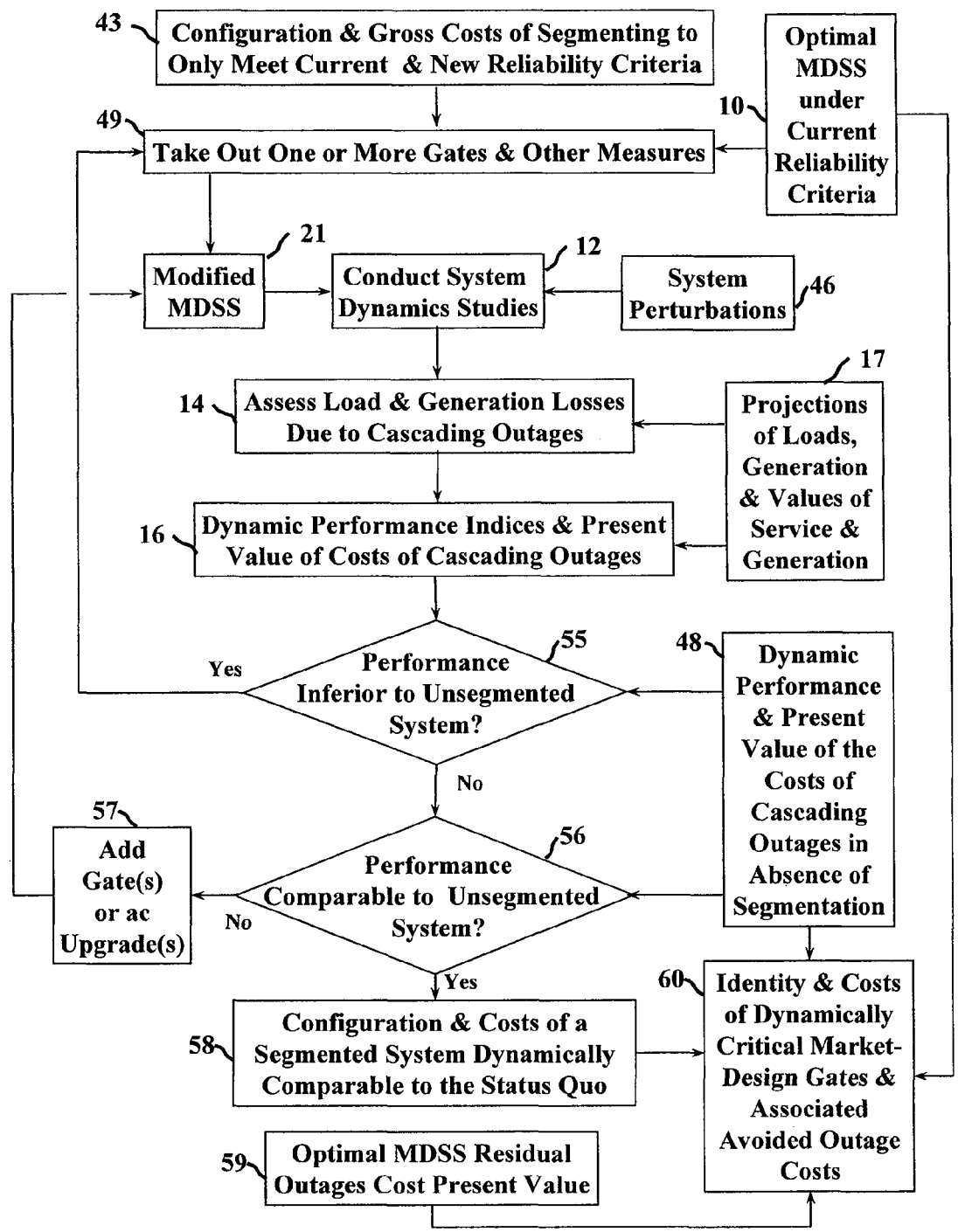
FIG. 8 is a flow chart of a process for identifying dynamically critical gates in a system segmented for market-design purposes only and to determine the costs of the critical gates and of associated avoided outages.

Consumer advocates may view giving market-driven projects reliability credits valued at the full cost of implementing a set of dc gates as unwarranted subsidization of private sector investments. Such critics may demand that any credit for segmentation be limited to the expected values of avoided cascading outages. Therefore it is necessary to evaluate the contribution of MDSS-like projects to consumers' welfare in the form of economic losses that would have been incurred had cascading outages not been mitigated by grid segmentation. Such avoided costs are forecasted as the present value of the costs of outages without segmentation 48 minus the present value of the economic losses associated with the residual outages of the MDSS 10. The present value of the economic losses resulting from the residual outages of the optimal MDSS are estimated in the first round of the system dynamic studies at 16 (FIG. 5) and passed on to 60 by way of 59 (FIGS. 5 and 8). All the information needed to assess the dynamic reliability costs and benefits of MDSS gates is assembled in 60.

F. Deriving the Net Cost of Segmenting for Market Enhancement Only

Figure 9:
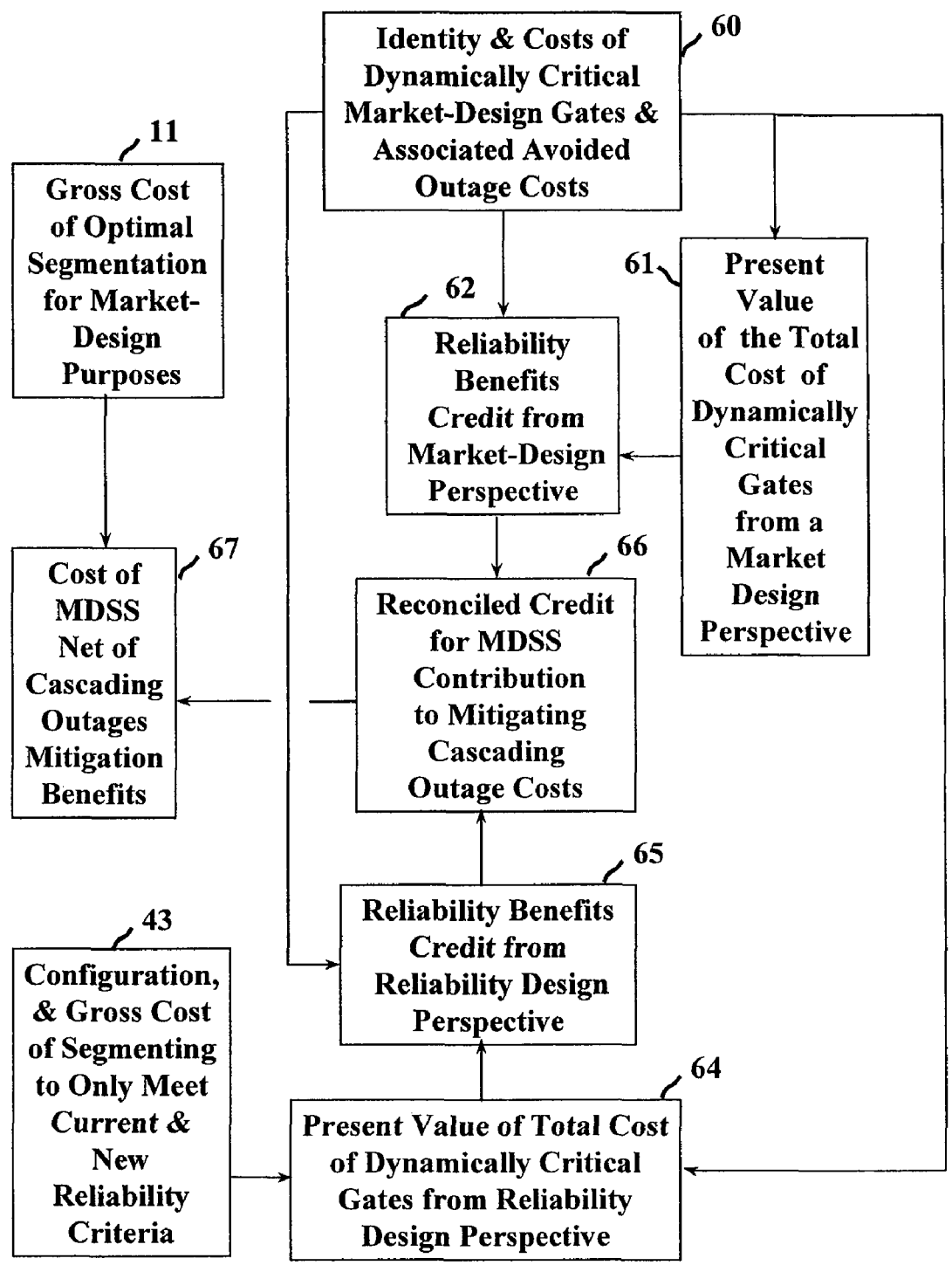
FIG. 9 is a flow chart of a process for calculating the cost of segmenting ac grids for market-design purposes net of a credit for partial mitigation of cascading outages.

FIG. 9 describes the last series of steps in the segmentation design process for market enhancement only. These steps are concerned with deriving the cost of segmenting an ac interconnection for market design purposes only net of the value of the benefit of a quantifiable level of protection of the interconnection from cascading outages. Quantifying and netting out rate-based reliability credits from the costs of such projects could be essential to rendering them economically viable.

The process for deriving the net cost of segmenting an ac grid for market-design purposes only starts at 43 and 60 in FIG. 9 (originally from FIGS. 6 and 8, respectively). Information about the costs of the individual gates identified (through the algorithm in FIG. 9) as dynamically critical for averting or containing cascading outages 60 is processed into a present value of the total cost of implementing these gates 61. Investors in market-design segmentation may wish to reappraise the costs of these gates upwards by stripping away the economy of scale savings that would accrue in increasing the size of the investment from the more limited set of the dynamically significant gates to the full set needed for the market enhancement design. (The rationale for this is that grid users, including ratepayers, would have to pay more per gate to acquire a smaller set of gates.) Which estimate will be sponsored in 61 depends on the aggressiveness of the investors and their expectations about ratepayers' willingness to support a rate-based reliability credit for their project.

The worth of the dynamically important gates is better reflected by the present value of avoided economic losses (PVAEL) as a consequence of reduced cascading outages 60. To the extent PVAEL could be credibly estimated, it becomes a better measure of the avoided costs credit for market-design segmentation projects. Note that if the term economic losses were broadened to include all users of the grid, PVAEL would be equal to the sum of the present values of ratepayers' and generators' avoided outage costs. However, it should be emphasized that the dominant contributor to PVAEL is expected to be the economic worth of avoided outage-related losses for ratepayers. (This is because customer service interruption costs are one to three orders of magnitude higher than the prices normally commanded by generators.) Also, whereas the ratepayers' contribution to a reliability credit could be arranged through a retail-rates charge, the generators' share could be collected as a service fee by the responsible grid operator(s).

The estimation of PVAEL will involve handling considerable uncertainties associated with the accuracy of, primarily, the simulation of the frequency, duration, timing and geographic domain of cascading outages, and to a lesser extent, the VOS data used. However, scientific engineering methods for establishing verifiable techniques for producing acceptable estimates and for quantifying the associated uncertainties are available. Moreover, it is expected that PVAEL values will be large enough to make up for the risk of over estimating the reliability credit as set out in this process.

In 62, PVAEL (from 60) is juxtaposed against the present value of the costs of dynamically significant gates from a market-design perspective (PVCDGMP) 61. If PVAEL is found to be the lesser of the two, it sets the value of the reliability benefits credit from a market-design perspective (RBCMDP) 62. If PVAEL is the larger of the two, PVCDGMP could act as a cap on what users of the grid are willing to pay to avoid the consequences of cascading outages. Symbolically, the valuation of the cascading outages reduction credit from a market-design perspective could be determined as follows:

$$\text{If PVAEL} \leq \text{PVCDGMP then RBCMDP=PVAEL} \quad (3)$$

$$\text{If PVAEL} > \text{PVCDGMP then RBCMDP=PVCDGMP} \quad (4)$$

The formulation expressed by (3) is defensible since one does not expect grid users to pay for a reliability credit greater than the value of potential avoided outage costs. However, sponsors of market-design segmentation may argue against capping the amount of deserved credit by the PVCDGMP estimate—as in the expressions given by (4)—because in their view the potential savings to be realized by users of the grid are better represented by the present value of the avoided economic losses. In addition to this uncertainty over how to estimate the credit, the costs of the gates may or may not reflect the economy of scale savings that larger projects bring with them. Considering these potential differences between grid users and segmentation developers, the design process will yield a reliability benefits credit 62 somewhere between the lower of and the higher of the present values of the avoided costs of potential outages 60 and of the total cost of implementing dynamically critical gates 61. The value ultimately applied would have to be settled through negotiations and, or regulatory proceedings.

Regardless of the method used, any value assigned to the reliability benefit credit 62 would always represent a market-design perspective since the basis for all of the underlying estimates is a market-focused segmentation project. An estimate from a reliability-design perspective is therefore needed. This is accomplished by upward adjustment of the costs of implementing the critical gates for market-enhancement purposes 60 to account for the diseconomy of scale associated with using fewer gates to segment an interconnection for reliability purposes only 43 (originally from FIG. 6). The resultant present value 64 of the total cost of the dynamically critical gates from a reliability-design perspective (PVCDGRP) is then juxtaposed against the present value of the avoided economic losses 60 to develop a reliability benefits credit from a reliability design perspective 65. The estimation of the cascading outages reduction credit from a reliability-design perspective (RBCRDP) could be conducted in accordance to:

$$\text{If PVAEL} \leq \text{PVCDGRP then RBCRDP=PVAEL} \quad (5)$$

$$\text{If PVAEL} > \text{PVCDGRP then RBCRDP=PVCDGRP} \quad (6)$$

The condition represented in (5) is defensible for the same reasons discussed above for the market-design perspective case. And again, sponsors of market-design segmentation may oppose capping the value of the credit by the PVCDGRP estimate—as specified in (6)—by advocating that the present value of avoided economic losses are more representative of the worth of the reliability benefits of their project. Additionally, PVCDGRP may reflect the economy of scale savings associated with meeting new cascading outages criteria or it might exclude them (by limiting the estimation to the smaller set of the dynamically significant gates matching those identified in the market-design segmentation case). Therefore, the value of the credit from a reliability-design perspective 65 will fall somewhere between the lower of and the higher of the PVAEL estimate 60 and of the PVCDGRP value 64. The number ultimately used would have to be determined through negotiations and, or regulatory proceedings.

In 66, the estimates of the reliability benefits credit from a market-design perspective 62 and from a reliability-design perspective 65 are reconciled through negotiations and, or regulatory proceedings into a mutually agreeable value. This reconciled reliability benefits credit (RRBC) could be determined in 66 by one of the following methods:

If the present value of avoided outage costs is to be used exclusively then $$RRBC=PVAEL \quad (7)$$

Depending on the value PVAEL attains, Equation (7) could produce either the lowest or highest credit values for market-design segmentation projects.

If the choice is to set the reliability credit at the highest possible value, RRBC would be determined by:

$$\text{If PVAEL} \leq \text{PVCDGRP then RRBC=PVCDGRP} \quad (8)$$

$$\text{If PVAEL} > \text{PVCDGRP then RRBC=PVAEL} \quad (9)$$

If setting the reliability credit at the lowest possible value is preferred, RRBC would be decided by:

$$\text{If PVAEL} \leq \text{PVCDGMP then RRBC=PVAEL} \quad (10)$$

$$\text{If PVAEL} > \text{PVCDGMP then RRBC=PVCDGMP} \quad (11)$$

Note that in the above relations, it is assumed that PVCDGMP is less than PVCDGRP. This assumption is correct to the extent that segmenting for market-design purposes would involve more gates than reliability enhancement projects. The relations expressed by (7) though (11) define the boundaries that the value of the reliability credit could take on. In this sense, they could serve as a road map for early exploration of the economics of market-design segmentation and setting public policy direction for how to encourage interregional investment in the new technology.

The RRBC value 66 is passed on to 67 where it is netted out from the gross cost of the optimal MDSS 11. The gross cost estimate 11 is determined through the algorithm described in FIG. 4. The final result 67 should provide the key information for determining the economic feasibility of any proposed market-design segmentation of an ac interconnection.

G. The Net Cost of a Fully Dynamically Secure Market-Enhancement Design

Figure 10:
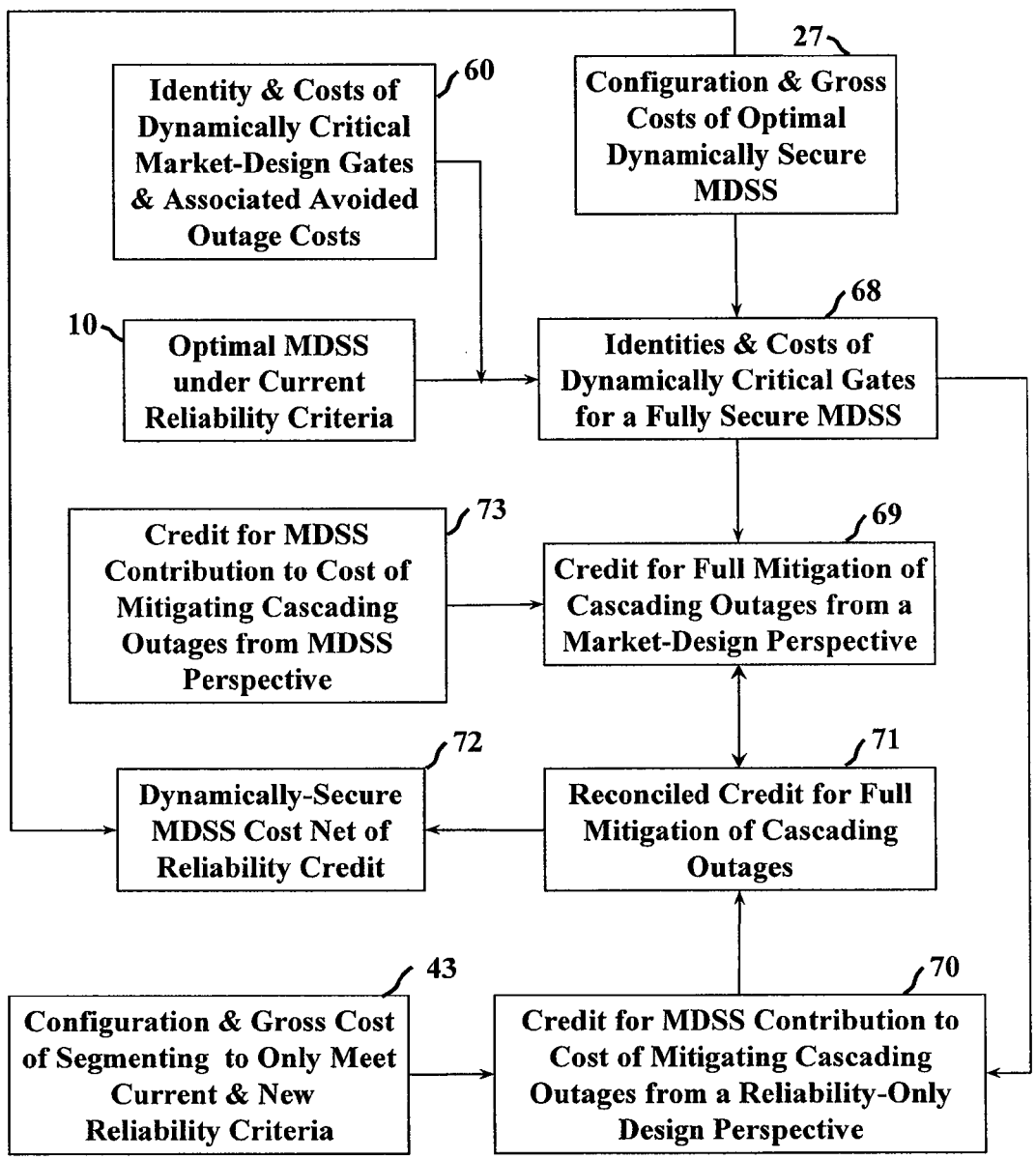
FIG. 10 is a flow chart of a process for calculating the cost of segmenting ac networks for market-design and reliability enhancement purposes net of a credit for full mitigation of cascading outages.

This last stage of the process is for deriving and netting out a reliability-benefits credit from the gross cost of segmenting an ac interconnection to establish a dynamically secure market design. The value of the credit could determine the economic viability of such projects. This algorithm to be used to achieve this goal is depicted in FIG. 10.

The process for deriving the net cost of segmenting an ac grid for both market-design and dynamic security purposes (FIG. 6) is quite similar to the one devised for solely market enhancement projects (FIG. 9). Hence, some of the explanatory comments presented in Subsection II-F will not be repeated here. The first step is to identify and establish the costs of the dynamically critical gates for a fully secure MDSS 68. This is accomplished in 68 by: (i) identifying the gates added to the optimal MDSS to achieve the desired increase in dynamic security; and (ii) combining this information with the list of the dynamically significant gates for the optimal MDSS case. The information needed for Item (i) is obtained by comparing the configurations of the optimal MDSS 10 (originally from 10 FIG. 4) and the fully secure MDSS 27 (originally from FIG. 5). The list of the dynamically significant gates for the optimal MDSS can be obtained from 60 in FIG. 8.

Having identified the gates needed to provide the desired degree of protection for the interconnection against cascading outages, the present value of the total cost of implementing these gates is then calculated in 68. Sponsors of market-design segmentation may want to strip away the economy of scale savings associated with increasing the size of the investment from the smaller set of the dynamically significant gates to the full set required for the market enhancement design. Hence, two estimates of a reliability credit based on the costs—from a market-design perspective—of implementing gates could emerge from 68: a low PVCDGMP value that would reflect the economy of scale attainable with the larger investment in dc segmentation, and a high PVCDGMP value representing the costs of investing in only the gates needed to achieve full dynamic security.

To the extent PVAEL could be reliably estimated, it becomes a better measure of the avoided costs credit for market-design segmentation projects. The dominant contributor to this parameter is expected to be the economic worth of avoided outage-related losses for ratepayers. PVAEL is estimated in 70 by subtracting the present value of the residual cascading outage costs of the optimal dynamically secure MDSS (provided in 27 by way of FIG. 5) from the present value of the cascading outages that could have taken place in the absence of any level of segmentation (given by 48 by way of FIG. 7).

In 69, PVAEL 70 is compared to PVCDGMP from 68. If PVAEL is found to be the lower of the two, it sets the value of the reliability benefits credit from a market-design perspective (RBCMDP) 69. If PVAEL is the greater of the two, PVCDGMP could act as a cap on what users of the grid are willing to pay to avoid the cascading outage risks. From a market-design perspective, the assessment boundaries for the cascading outages reduction credit could be determined by the expressions (3) and (4).

The formulation presented in (3) says grid users would not pay for a reliability credit greater than the value of potential avoided outage costs. However, sponsors of market-design segmentation may object to (4) as unjustifiable capping of the amount of deserved credit by the PVCDGMP estimate. In their view, the potential savings to be realized by users of the grid are better represented by PVAEL. In addition to this uncertainty, gate costs may or may not reflect the economy of scale savings that larger projects bring with them. In light of these potential differences between grid users and segmentation proponents, the reliability-benefits credit 69 will be bounded by the lower of PVAEL and the low value of PVCDGMP, and the higher of PVAEL and the high value of PVCDGMP. The estimate ultimately used would have to be determined through negotiations and, or regulatory proceedings.

Since any value assigned to the reliability benefit credit 69 would always represent a market-design perspective, an estimate from a reliability-design perspective (a PVCDGRP value) is needed. Such alternate valuation is provided in 71 by adjusting the costs in 68 of acquiring the dynamically significant gates by the level of economy (or diseconomy) of scale associated with the configuration and costs of segmenting the same system to only meet current and new reliability criteria 43 (originally from FIG. 6). Assuming the number of gates required to achieve the desired market segmentation is greater than what would be needed to only secure the system dynamically, the reliability-design estimate PVCDGRP would be lower than the PVCDGMP value of 68.

In 72, the estimates of the reliability benefits credit from a market-design perspective, RBCMDP, 69, and from a reliability-design perspective, represented by PVCDGRP 71, are reconciled through negotiations and, or regulatory proceedings into a mutually agreeable value. This reconciled reliability benefits credit for a market-design with full dynamic security (RRBCMDFDS), could be determined in 72 by one of the following methods:

If the present value of avoided outage costs is to be used exclusively then $$RRBCMDFDS=PVAEL \qquad (12)$$

Depending on the value of PVAEL, Equation (12) could result in either the lowest or highest credit values for market-design with full dynamic-security segmentation projects.

If the credit is to be set at the highest value, RRBCMDFDS would be determined by:

$$\text{If PVAEL} \leq \text{PVCDGRP then}$$
$$RRBCMDFDS=PVCDGRP \qquad (13)$$

$$\text{If PVAEL} > \text{PVCDGRP then } RRBCMDFDS=PVAEL \qquad (14)$$

If setting the credit at the lowest value is preferred, RRBCMDFDS would be decided by:

$$\text{If PVAEL} \leq \text{PVCDGMP then } RRBCMDFDS=PVAEL \qquad (15)$$

$$\text{If PVAEL} > \text{PVCDGMP then}$$
$$RRBCMDFDS=PVCDGMP \qquad (16)$$

In the above relations, it is assumed that PVCDGMP is less than PVCDGRP. This assumption-holds as long as segmenting for market-design purposes would involve more gates than reliability enhancement investments. The relations expressed by (12) though (16) define the quantitative limits that the value of the reliability credit could fall within.

The RRBCMDFDS value 72 is netted out, in 73, from the gross cost of implementing the optimal dynamically secure MDSS (from 27) to produce the net cost 73 of segmenting an ac interconnection for both market-design purposes and to achieve the desired level of dynamic security against cascading outages. The final result 73 should furnish the key information for determining the economic feasibility of any proposed market-design and dynamic segmentation of an ac interconnection.

III. Inter-Market Transmission Access Optimization and Scheduling

The Inter-Market Transmission Access Optimization and Scheduling (IMTAOS) process fulfills the pressing need for a better way of utilizing existing and future transmission infrastructures. As stated before, IMTAOS accomplishes this feat by making use of (1) the complete controllability of power flows between trading grid sectors (regions) with the help of dc gates, and (2) the ability to expand ATC through the economic scheduling of counter-flows.

As shown in FIGS. 11, 17, 19, and 21, IMTAOS provides a novel process for optimizing and scheduling the allocation of inter-sector gate ATC among competing requests for transmission service during periods of normal grid operation.

Emergency conditions, which should be very rare in well performing grids, will require backup plans and operating procedures in the event of failure of power system elements. Such plans and operating procedures will have to be implemented to provide fast operator and automatic control responses to minimize the impact of loss of power system elements on scheduled transactions and on system reliability. The real-time scheduling-algorithms presented in FIGS. 19 through 22 could be an integral part of system recovery plans against major (or minor) loss of generation and/or load. Thus, although the novel allocation process is concerned with normal system operation, it could also be essential in emergency situations.

Recent and on-going efforts to restructure the electric power industry favor the development of multi-settlement systems comprising two or three of the following inter-related markets: the Day-Ahead (DA), Hour-Ahead (HA) and Real-Time (RT) markets. IMTAOS provides the means for optimizing the utilization of transmission systems for all three markets in an integrated manner as illustrated by FIGS. 11 through 16, 17, 18, 19 and 20, which depict the interactive applications of IMTAOS.

The invention also applies to regions that choose a 2-settlement structure, normally the DA and RT as has been envisioned in the Standard Market Design initiative of the U.S. Federal Energy Regulatory Commission (FERC). FIGS. 11 through 16, 21 and 22 show how a 2-market system can be accommodated by IMTAOS.

In addition to the inter-temporal integration of markets, IMTAOS can also integrate markets of different regions if dc-aided segmentation for controlling inter-regional power flows were implemented. This crucial capability accomplishes two unprecedented feats: (1) matching and coinciding the contract path of any inter sector transaction with an identifiable physical path of the associated flow of electric power; and (2) full exploitation of counter-flows to maximize ATC in the direction of potential congestion. This is illustrated by the processes shown in FIGS. 11 through 22.

A. The Normal Day-Ahead Inter-Sector Scheduling Process
1. Overview (FIG. 11)

Figure 11:
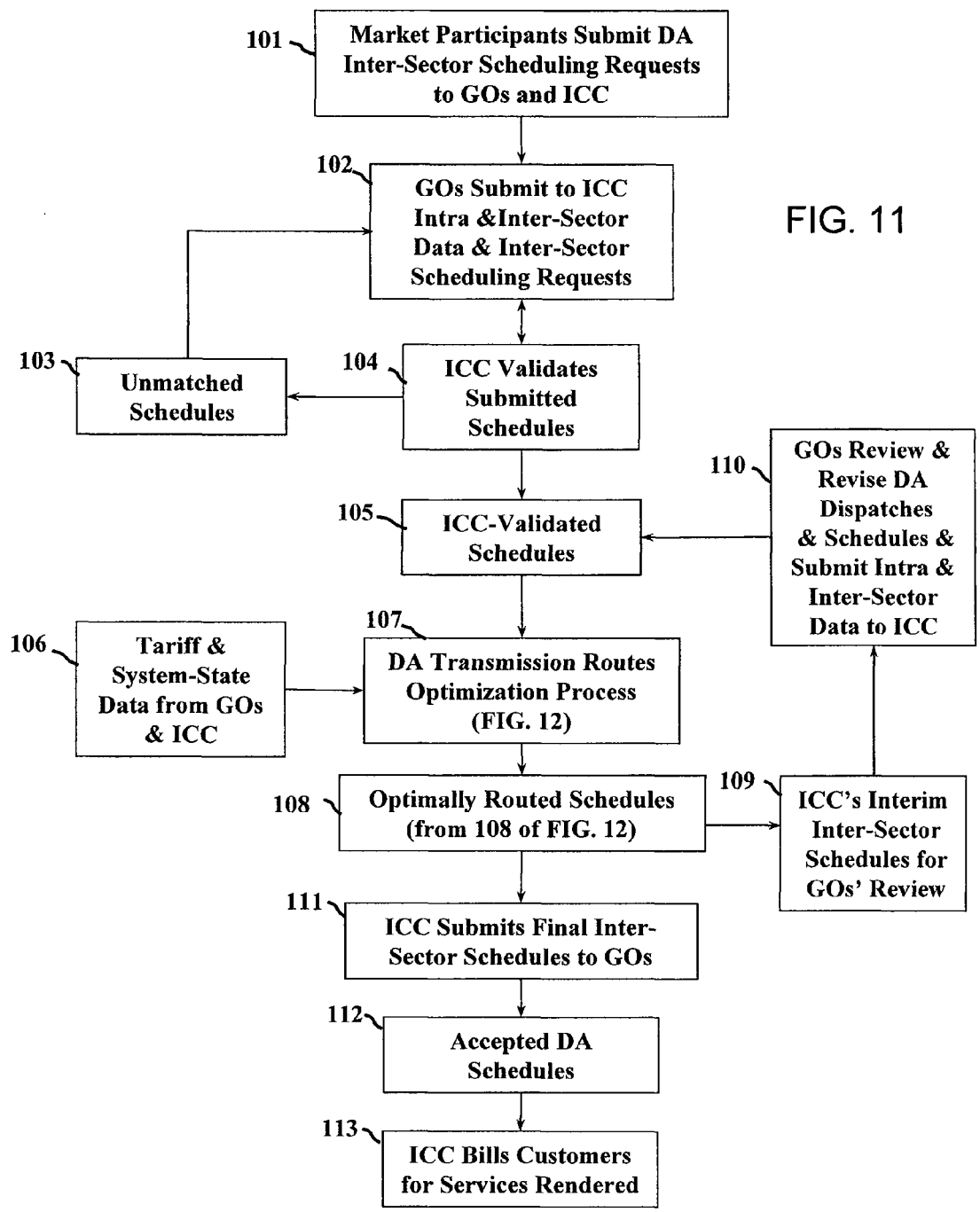
FIG. 11 is a flow chart providing an overview of the day-ahead inter-sector scheduling process.

The process shown in FIG. 11 generates optimal allocation of inter-sector ATC among DA inter-regional transmission service customers even if the collective demand for such service exceeded the ATC physically present.

The novel allocation process for normal system operation starts at 101 in FIG. 11 when market participants submit requests to their respective GOs and to ICC for transmission service to carry out inter-sector trades in the DA market. The GOs may impose different deadlines for submitting service requests as long as they are within a mutually agreeable cutoff time (probably between 7 a.m. and 10 a.m. on the day preceding the DA market; i.e., next day of actual grid operation).

In 102, the GOs relay the requests for DA service to ICC along with intra and inter-sector system and market information that ICC would need to configure the optimal allocation of inter-sector ATC. The required data includes market clearing prices (MCPs), uplift charges (if applicable), cost of intra-sector transmission service and relevant transmission outages and losses.

ICC validates in 104 the submitted scheduling requests by cross checking the information it receives from the market participants and the GOs on the sending side with their counterparts on the receiving end. Unmatched requests 103 would be sent back to the GOs 102 for review and final consolidation. Only the matched scheduling requests are validated by ICC 105. And only the validated schedules would be processed further.

In 107, ICC makes use of its ability to control inter-sector flows through its network of gates to generate counterflows and to configure optimal routes to meet transmission customers' needs. The process encapsulated in 107 is detailed in FIGS. 12 through 16. It requires GO and ICC system state and tariff data 106 and as indicated earlier in the description of 102.

The process involving 107 would have to be carried out over at least two rounds. ICC submits the first round results of the optimally routed schedules 108 to the GOs for review and further action 109. In 110, the GOs will revise, if necessary, their DA dispatches and schedules, and submit any subsequent changes in the data they provided to ICC per 102 and 106. ICC would then repeat 107 to generate a second round of counterflows and optimal routes for power delivery 108. If the new schedules in 109 do not require significant revision of the GOs' DA dispatches, the process stops and ICC submits its final inter-sector schedules to the GOs 111.

In 112, the GOs formally accept ICC's schedules. This would allow ICC to bill its transmission customers for the inter-sector scheduling services it provided 113.

Figure 12:
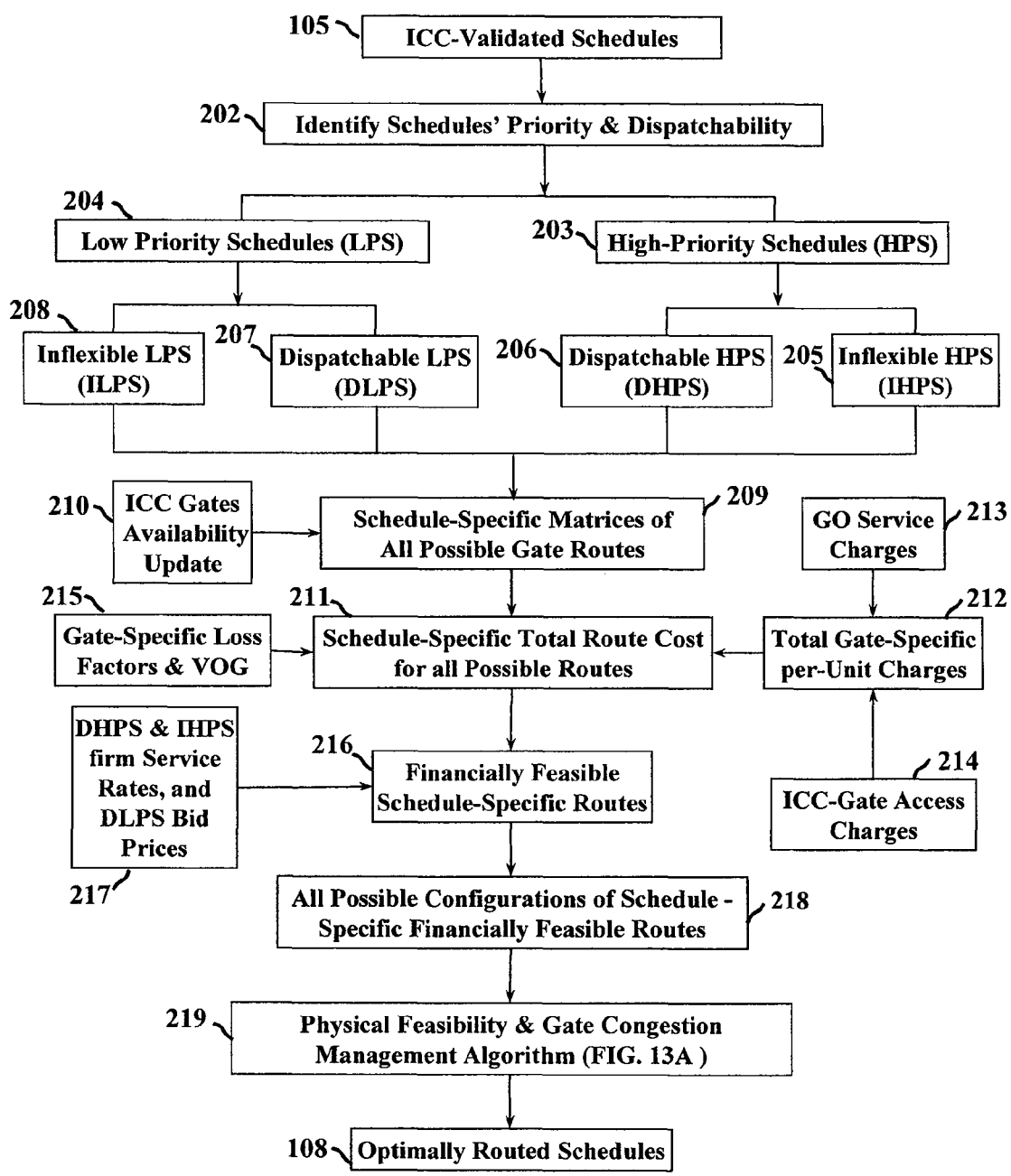
FIG. 12 is a flow chart of the day-ahead transmission routing optimization process.

2. Day-Ahead Transmission Routing Optimization (FIG. 12)

The objective of the DA transmission routes optimization process, as detailed by FIGS. 11 through 16, is to achieve a least-cost joint-dispatch of the interconnection's network of dc gates while avoiding to the extent possible any curtailment of customers' schedules. The process starts with the ICC-validated schedules 105 of FIG. 11. Using information provided in the customers' templates for service requests, the ICC identifies the service priority and dispatchability of the validated schedules 202. Subsequently, the submittals are divided into two classes: high-priority schedules (HPS) 203 and low-priority schedules (LPS) 204. The HPS represent customers who own firm-service rights over one or more gates. The LPS are for those who choose to seek inter-sector transmission service on an as-available basis. They do not own any rights on any gate. (If a customer owns rights on some gates and wants to schedule somewhere else, it could submit both types of schedule: HPS and LPS.)

The HPS and LPS are then dichotomized by their dispatchability (or lack thereof). HPS are divided into inflexible HPS (IHPS) and dispatchable HPS (DHPS). The former represents holders of rights who do not wish to decrement their schedules for any price they are offered. The DHPS are willing to give up certain portions of the capacity they hold in return for compensation. They essentially bid to supply capacity. The LPS is dichotomized similarly. However, the dispatchable LPS (DLPS) is a buyer of transmission service capacity at prices it is willing to bid. The inflexible LPS (ILPS) is willing to be served at essentially any price. It should be noted that the four categories represented by 205, 206, 207 and 208 encompass the widest spectrum of transmission customers. If intermediate or hybrid applications are encountered, one can decompose them into two or more of the aforementioned four schedule types.

Knowing the source (the electric bus, utility service area and sector of origin) and the ultimate destination (again the bus, utility and sector of the receiver), all possible routes (combinations of dc gates) would be devised using simple computer-aided comprehensive and systematic search routines. The only constraint on route synthesis is gate outages which are accounted for 210. The end product of 209 is a set of alternative routes for each schedule. Depending on the number of gates available and the number of sectors involved, a schedule could have 210 or more routes. The implication of this type of result is a significant increase in transmission services liquidity: a sorely needed improvement over the status quo.

The next step 211 is to estimate the total cost of service for each possible route. This requires two sets of data. First, reliable estimates of the total gate-specific per-unit tariff charges 212 which in turn are generated by adding up the appropriate grid-service fees 213 (that GOs may require for intra-sector support services) and ICC gate access charges 214. Both 213 and 214 could be affected by the schedule's service priority and dispatchability status. The second service category of needed cost information is the economic worth of transmission losses. This requires data on gate-specific transmission loss factors and value-of-generation (VOG) projections 215. VOG estimates can be obtained from market data trackers or other means.

The route-specific total cost of service developed in 211 is contrasted with what the HPS have pre-paid (for the rights they acquired on their choice of routes) and what the DLPS is willing to pay for their schedules 217. If the total cost of a route per 211 were to exceed the corresponding rates in 217, said route would be declared financially infeasible. The result of combining the information in 211 and 217 is a reduction of the matrices of all possible routes 209 into a set of financially feasible schedule-specific routes 216.

In 218, the route matrices of 216 are reorganized into distinct (unique) configurations of schedule-specific, financially feasible routes 218. Each configuration is in effect an alternate dc-network dispatch. Three conditions govern the synthesis of a configuration: (i) Every schedule must be part of every configuration; (ii) A schedule can appear only once in the configuration; and (iii) No route can be represented more than one time in a configuration.

Figure 13A:
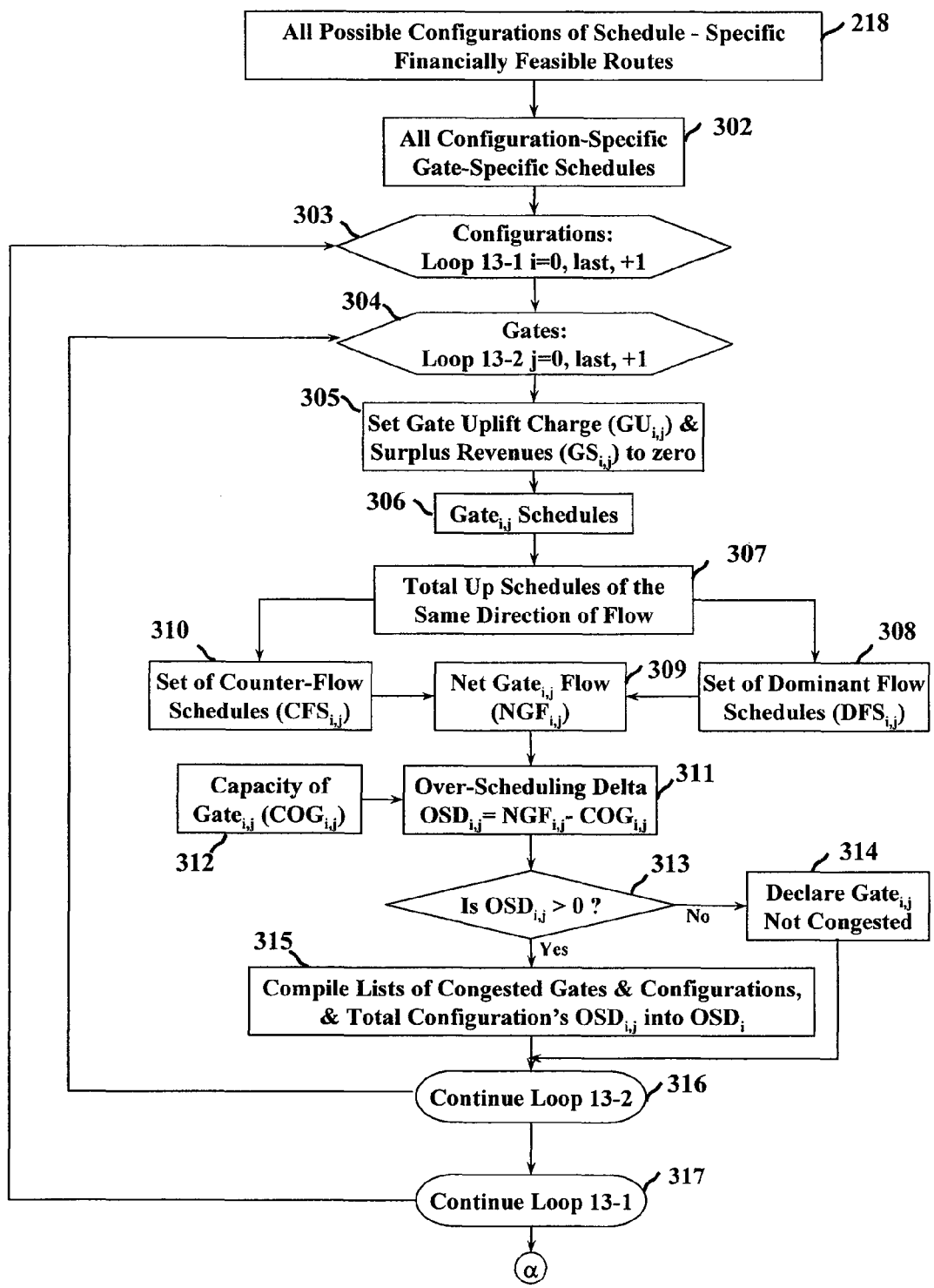
FIG. 13 consisting of FIGS. 13A to 13D is a flow chart of an algorithm for testing the physical feasibility of gate scheduling and for gate congestion management.
Figure 13D:
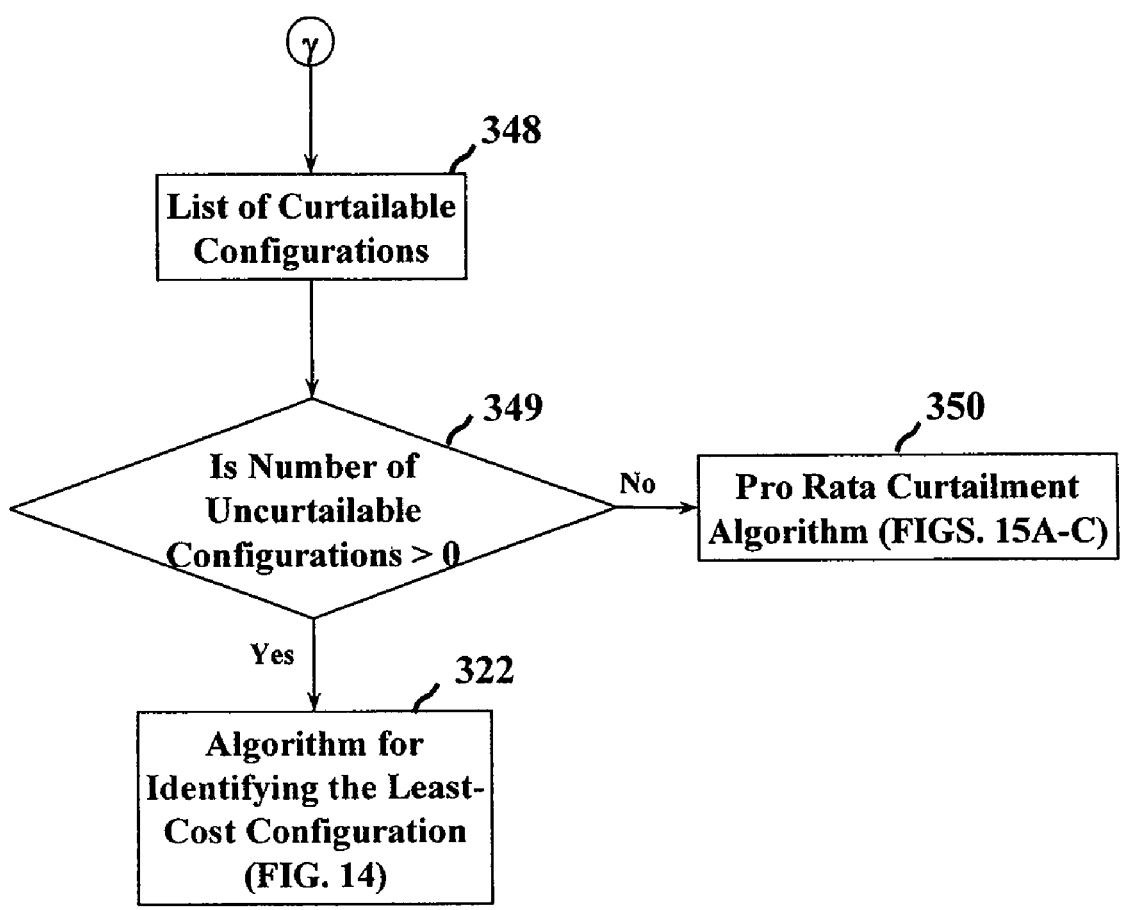

The information in 218 is passed on to the algorithm of FIG. 13: (i) Conduct gate congestion management (if needed); (ii) Enable the dispatch of every configuration of financially feasible routes 218—if necessary—through congestion management and/or pro rata LPS curtailments; and (iii) Identify the optimal set of routes (configuration) for the validated schedules 108.

3. The Physical Feasibility and Gate Congestion Management Algorithm (FIGS. 13A, B, C and D)

The purpose of this algorithm is to render all financially viable configurations physically feasible by conducting, where needed, gate congestion management. The logic presented in FIGS. 13A, B, C and D applies to DA, HA and RT schedules.

Figure 14:
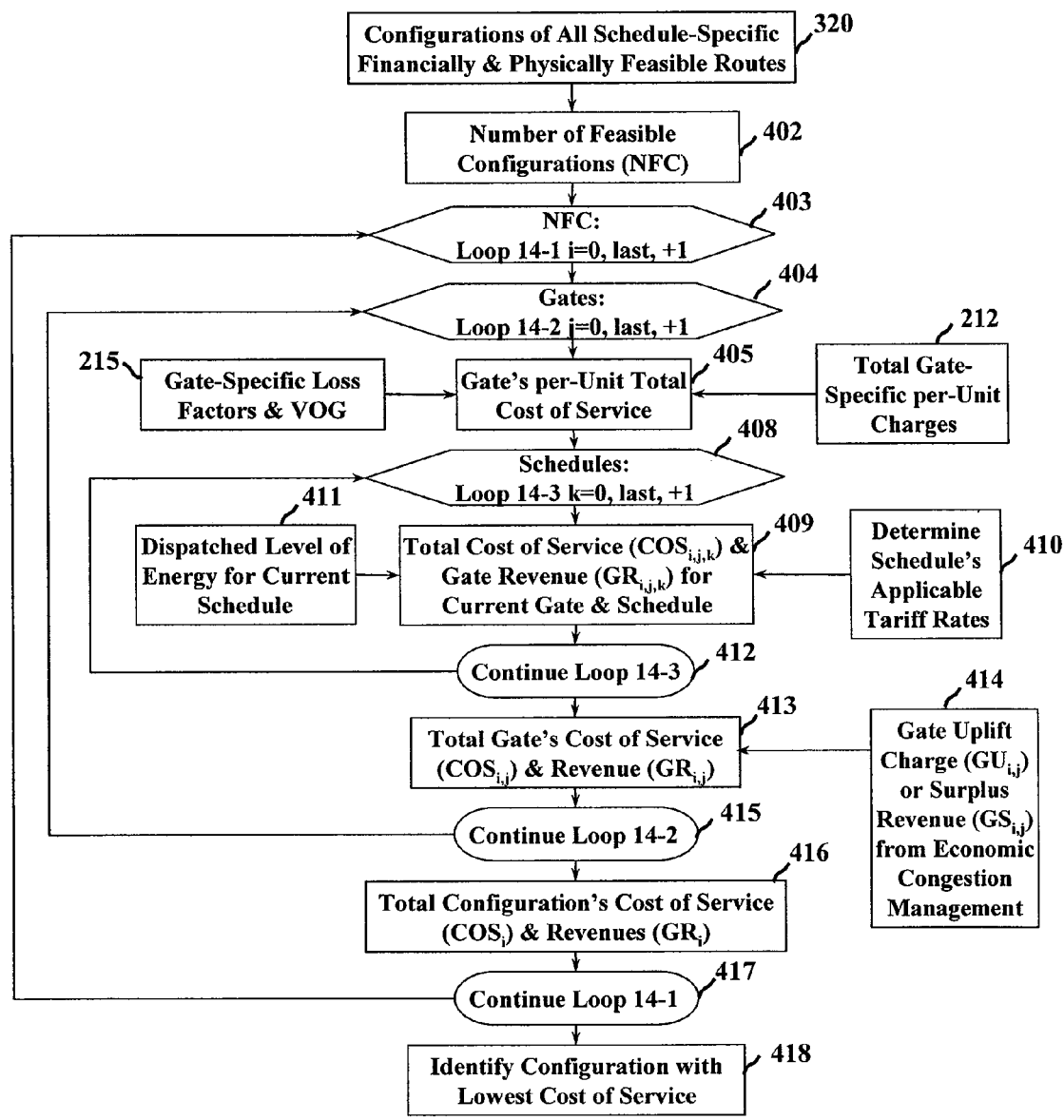
FIG. 14 is a flow chart of an algorithm for identifying the least cost configuration.
Figure 15A:
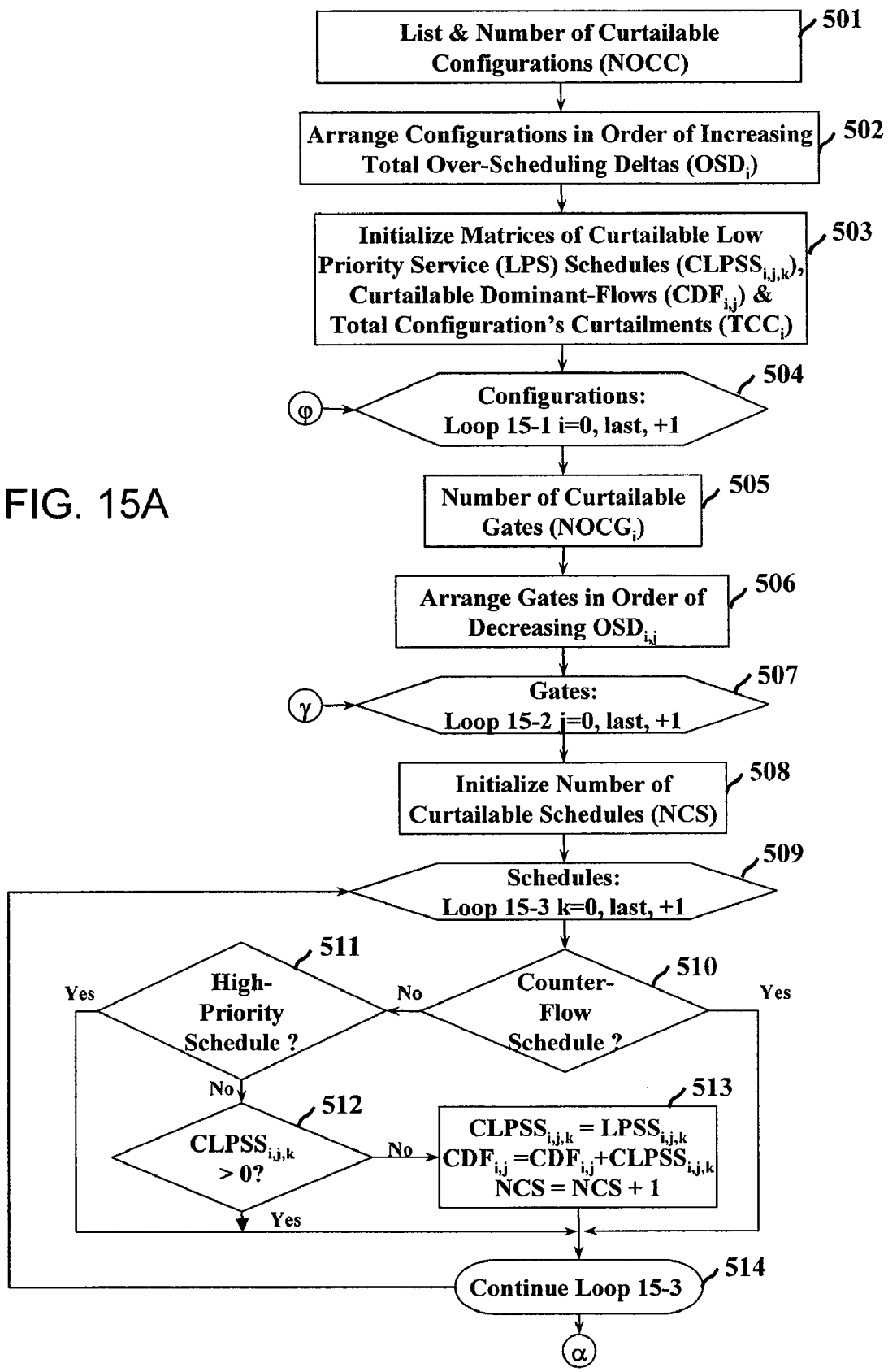
FIG. 15 consisting of FIGS. 15A to 15C is a flow chart of an algorithm for pro rata curtailment.
Figure 15B:
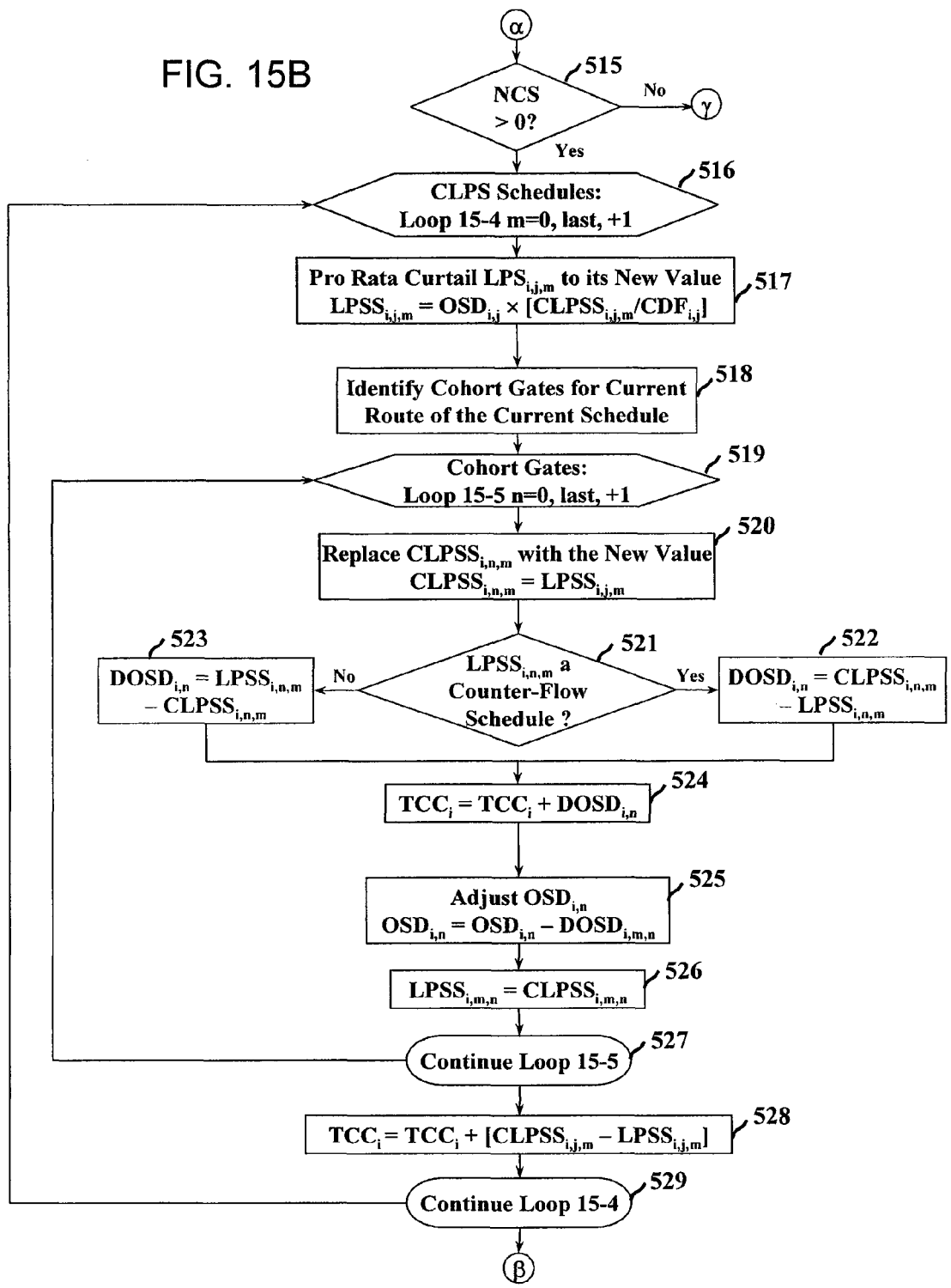
Figure 15C:
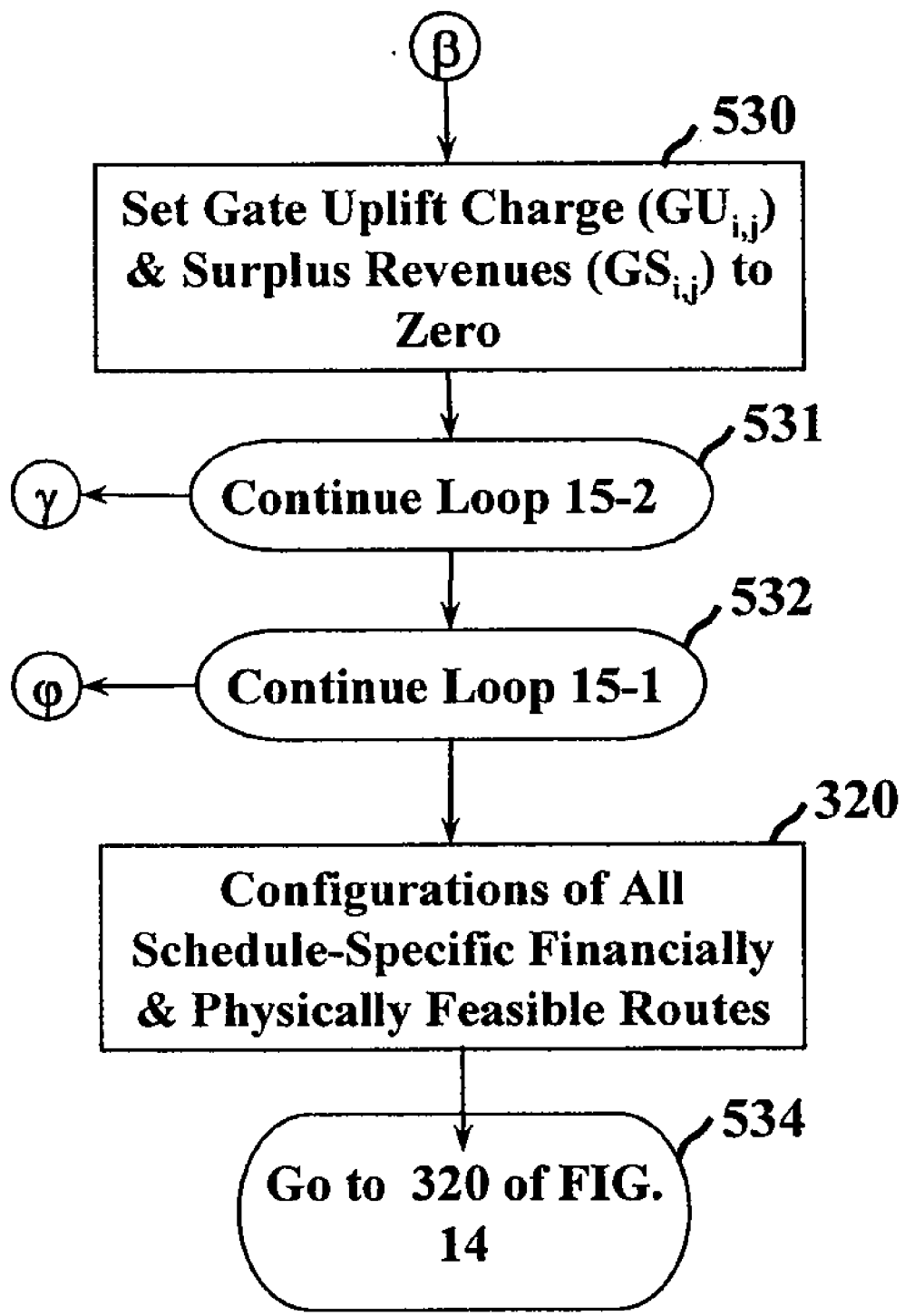
Figure 16A:
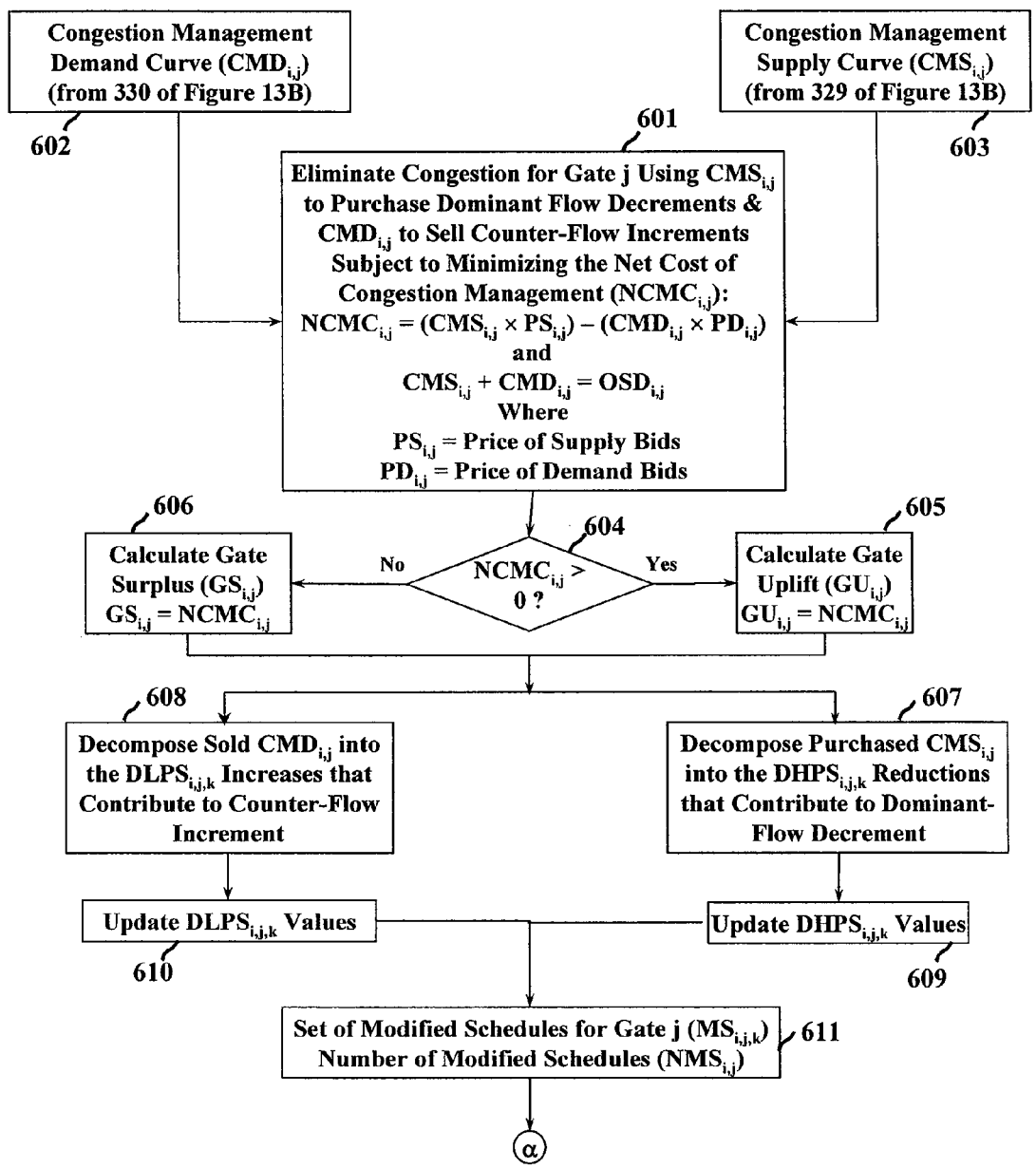
FIG. 16 consisting of FIGS. 16A to 16C is a flow chart of an algorithm for performing least-cost adjustments of gate schedules to eliminate congestion.
Figure 16B:
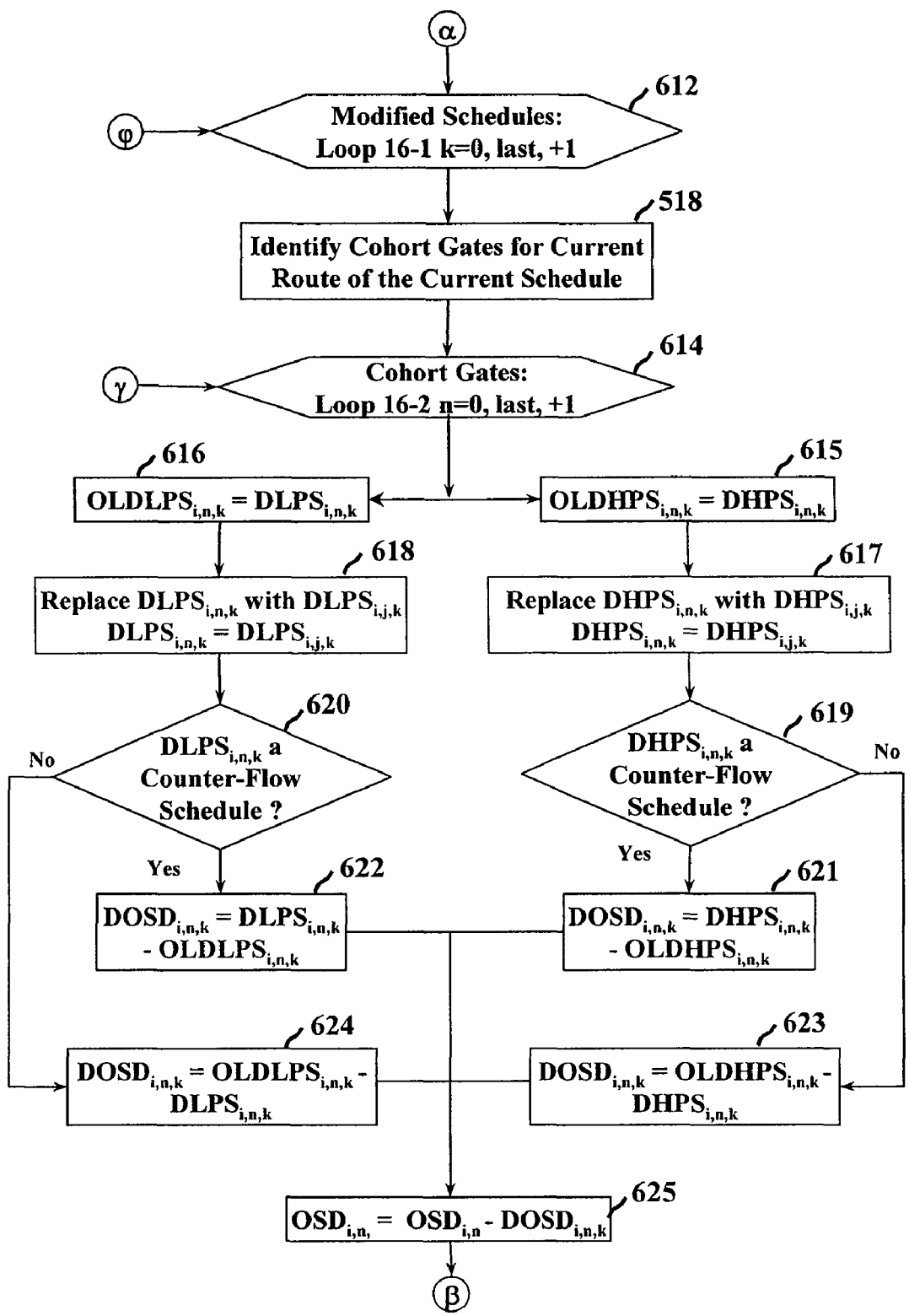
Figure 16C:
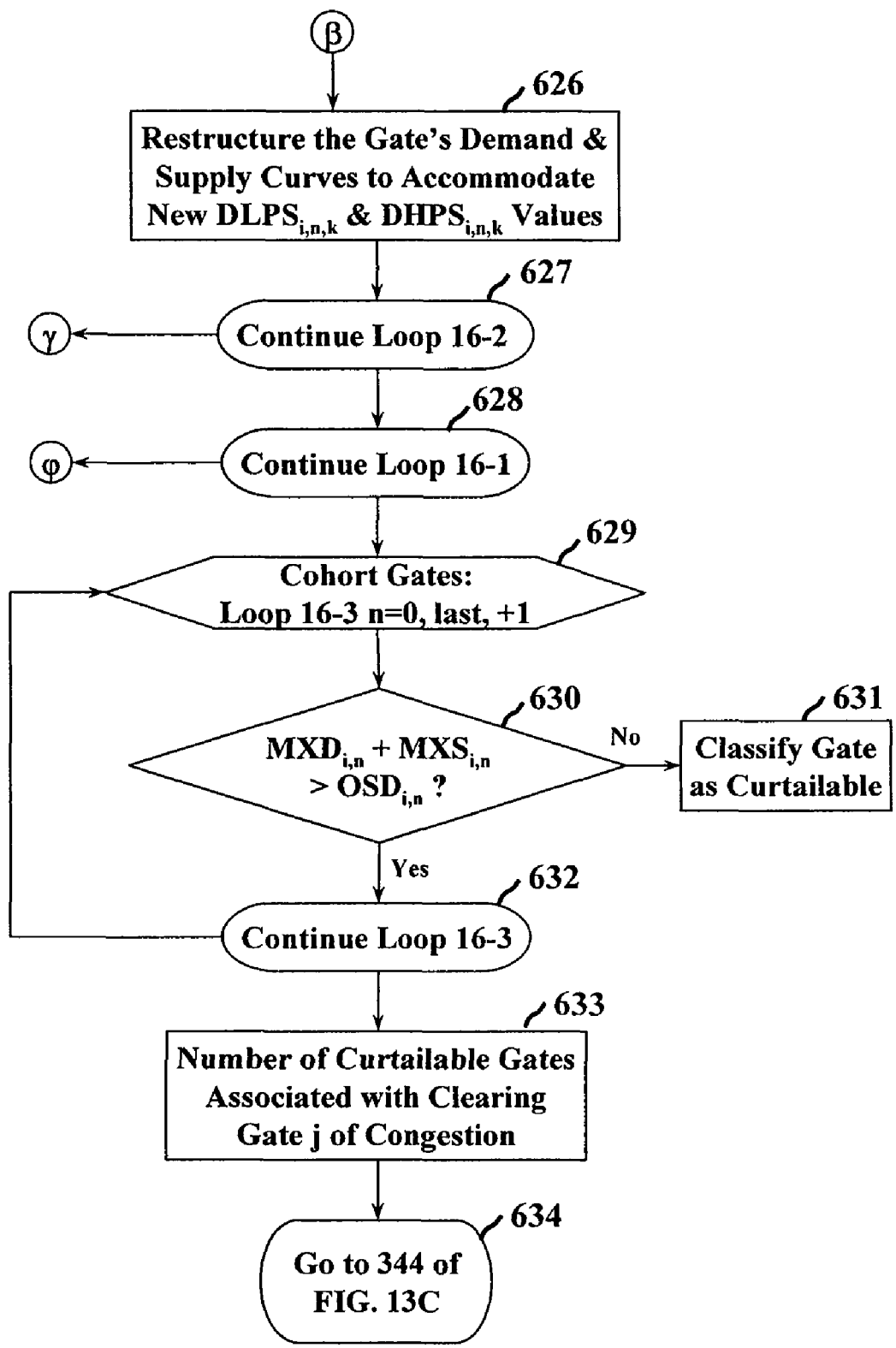

The primary tasks the algorithm performs are to:

Desegregate all schedules of all configurations into dominant and counter-flows (Steps 218 through 317);

Ascertain which configurations are free of congested gates and which are not (Steps 218 through 319);

Pluck out the congestion-free configurations and hand them over to a separate algorithm (FIG. 14) for identifying the least-cost dispatch (Steps 319 through 322);

Construct gate-specific supply (of dominant-flow decrements) and demand (for counter-flow adders) curves out of customers bids for congestion management purposes (Steps 323 through 335);

Identify which (if any) of the congested configurations must be curtailed for lack of sufficient counter flow adders and dominant flow decrements (Steps 323 through 336) and to subject such configurations to pro rata curtailment using the algorithm of FIG. 15 (Steps 336 through 338);

Perform a least-cost congestion management for the uncurtailable configurations with the aid of the algorithm of FIG. 16 (Steps 339 through 347);

Subject curtailable configurations to pro rata curtailment (by way FIG. 15 algorithm) if economic congestion management failed to produce uncongested gates (Steps 340 through 350); and Hand over the congestion-cleared configuration to the algorithm of FIG. 14 to identify the least-cost dispatch.

4. The Algorithm for Identifying the Least-Cost Configuration (FIG. 14)

This algorithm determines the total cost of service for each competing configuration (Steps 320 through 417) and uses the results to identify the lowest-cost combination of routes as the optimal dispatch for the system 418. The algorithm can be used for DA, HA or RT applications.

In addition to computing the cost of service (using tariff rates 410 for GO and gate ICC services, gate-specific loss factors, and VOG forecasts 215 and dispatch data 411), the algorithm also enables the assessment of (i) configurations' uplift charges (if the cost of buying dominant-flow decrements for DHPS holders exceeds the income from selling counter-flow adders to LPS applicants) (Steps 413 through 416); and (ii) configuration's surplus revenues (if the income from counter-flow sales surpass the payments for reducing dominant flows) (Steps 413 through 416).

5. The Algorithm for Pro Rata Curtailment (FIGS. 15A, B and C))

If none of the candidate configurations was capable of producing congestion-free dispatch, pro rata curtailment has to be invoked. The algorithm of FIGS. 15A, B and C accomplishes this task for DA, HA and RT applications. The algorithm ensures that only the schedules contributing to dominant flows (i.e., those that created the congestion) are curtailed (Steps 510 through 513 in the do-loop 504 to 532) and that out of this group only the LPS are subjected to pro rata reductions in the requested amounts of service (Step 511). The identified curtailable LPS are then pro rata adjusted to eliminate congestion (Steps 516 through 529).

As each gate is cleared of congestion, the algorithm assesses the impacts on the scheduling of cohort gates because of the invoked changes in the LPS schedules they share (Steps 519 through 527). All needed adjustments are implemented before moving on to the next gate 526. The algorithm is designed to proceed in order of decreasing gate congestion 506.

In addition in curtailing certain schedules to clear congestion, the algorithm also keeps track of the total amount of curtailments implemented for each configuration 528. And since pro rata reduction of customers' schedules does not involve paying for dominant-flow reductions or selling capacity in the direction of counterflows, uplift charges and revenues are set to zero 530.

The end product of the FIGS. 15A, B and C algorithm is a set of financially viable and physically feasible (by way of pro rata curtailments) configurations 320. This information is then passed on to the algorithm of FIG. 14 (to identify the least-cost dispatch among the competing curtailed configurations). Finally, it should be noted that the FIGS. 15A, B and C algorithm will be used only if no configuration free of congestion could be found and economic congestion management was not sufficient. Curtailment of schedules is a last resort option.

6. The Algorithm for Least-Cost Congestion Management (FIGS. 16A, B and C)

This algorithm exercises market-based management of congestion if: (i) no congestion-free configuration can be found; and (ii) curtailment of schedules can be avoided. It can be used for DA, HA and RT applications.

The objective function of the algorithm is to achieve least-cost resolution of congestion on a gate-by-gate basis. Using congestion management demand and supply (the CMD and CMS) curves from the algorithm of FIG. 13, congestion is eliminated at the current gate i by purchasing dominant-flow reductions from DHPS customers (i.e., moving down the CMD curve) 601, 602 and 603.

The outcome of moving along the CMD and CMS curves could be one of the following:

The prices demanded by DHPS sellers do not intersect with the prices offered by DLPS buyers at any level of dispatch: In this case, clearing congestion at the gate could either generate a surplus (if the total collected from DLPS sales exceeds the total paid out for DHPS purchases) or deficit (if payments to DHPS exceed the income from DLPS). In the latter situation, an uplift charge would be required. The treatment of surpluses would have to be decided through regulatory proceedings.

The two curves intersect at a unique point: Requiring (as is commonly practiced by grid operators) that bidders on both sides submit either single-quantity/single-price bids or multi-point monotonically increasing (for DHPS sellers) and monotonically decreasing (for DLPS buyers) offers, increases the chances of the intersection of the CMD and CMS curves at such unique point: the market clearing price (MCP) for congestion management. If the total of the schedule adjustments at the MCP turns out to be equal to or greater than what is needed to clear the congestion, the gate is revenue neutral: the amount paid to DHPS sellers equals what is paid by the DLPS buyers. If congestion resolution requires more adjustments, than can be obtained at the MCP, an uplift charge would be required. Depending on the results from 601, the algorithm calculates either a gate uplift 605 or a gate surplus 606. It should be emphasized that the objective function stated in 601 (i.e., the minimization of the net cost of congestion management) ensures a least cost adjustment of each gate's dispatch.

The next task for the algorithm is to decompose the CMS purchase(s) and CMD sale(s) into the specific DHPS and DLPS contributors 607 and 608, respectively. This information is then used to update the DHPS and DLPS levels at the current gate 609 and 610, and at the cohort gates (i.e., those sharing the affected schedules with the current gate) 612 through 628. The adjustments of the flows on the cohort gates are performed in a way that ensures accurate updating and tracking of dominant flows and counterflows 619 and 620. Steps are also taken to recalculate the over-scheduling delta for each inadvertently affected gate 625 and to restructure the CMD and CMS curves for such cases 626.

Having made the necessary scheduling adjustments, the algorithm then checks whether any of the cohort gates has been inadvertently rendered curtailable 627 through 633. The number of curtailable gates is then passed on to 344 in FIG. 13C for eventual pro rata curtailment.

B. The Normal Hour-Ahead Inter-Sector Scheduling Process

Figure 17:
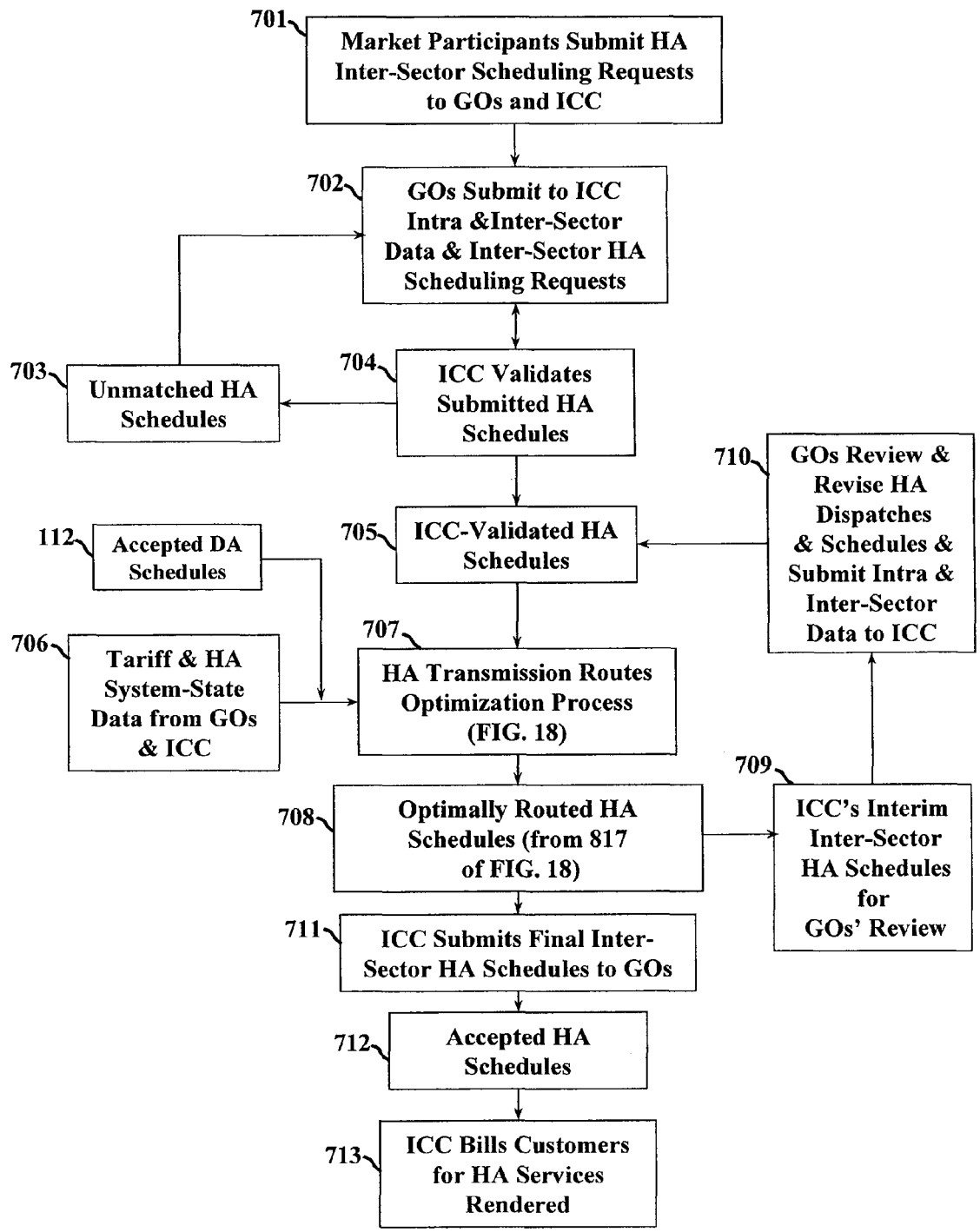
FIG. 17 is a flow chart providing an overview of a normal hour-ahead inter-sector scheduling process.
Figure 18:
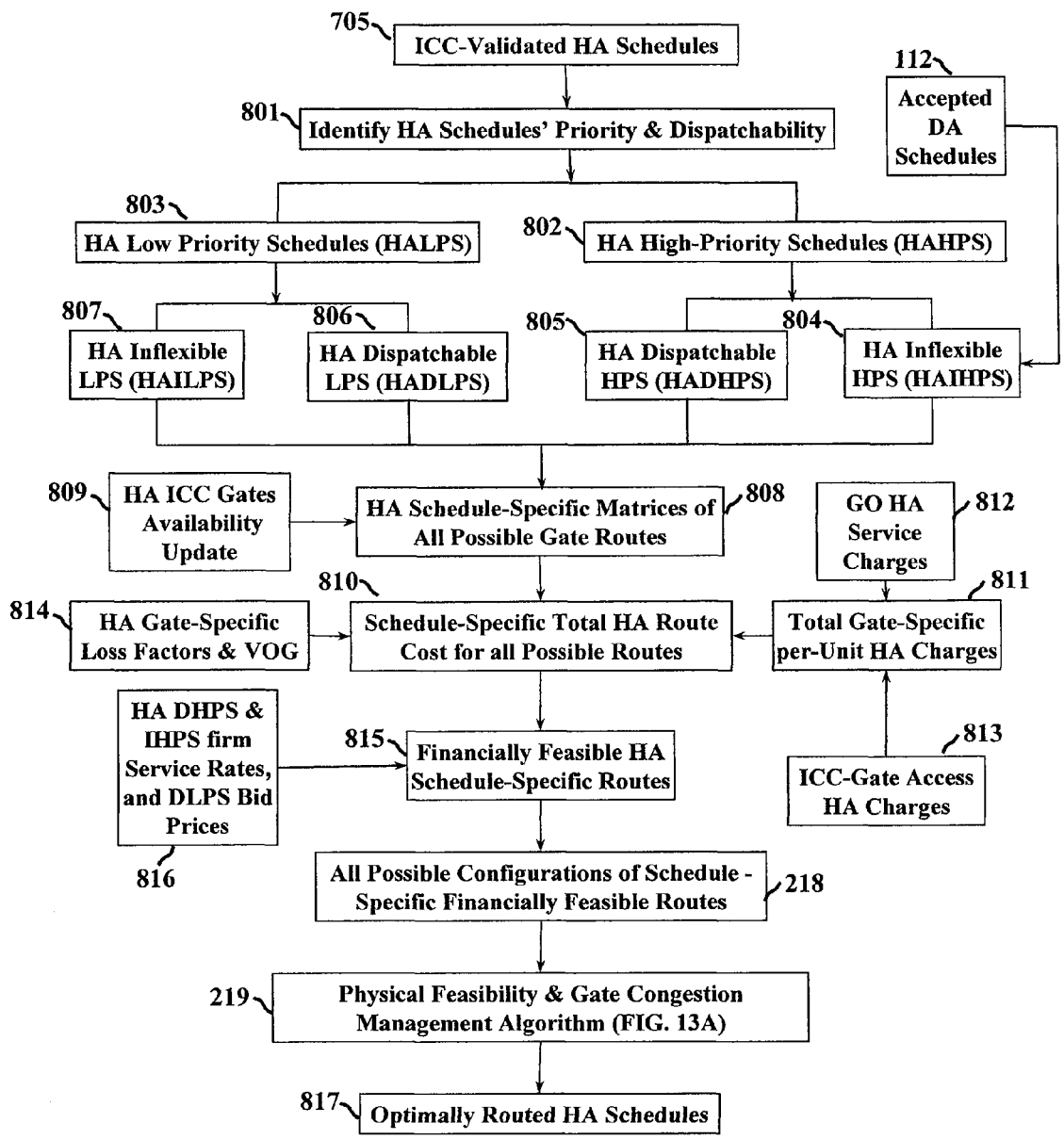
FIG. 18 is a flow chart of a normal hour-ahead transmission routing optimization process.

The HA process as exhibited in FIGS. 17 and 18 is essentially the same as the one for DA applications. With one exception, the description provided for FIGS. 11 and 12 applies here and will not be repeated. The difference between the two cases is the existence of committed DA schedules for the HA application. This is accounted for by 112 in FIGS. 17 and 18. In FIG. 17, accepted DA schedules 112 from FIG. 11 are included in the inputs into the HA transmission routes optimization process 707. In FIG. 18, the DA schedules 112 are incorporated as part of the set of HA inflexible high-priority schedules (HAIHPS) 805. The rest of the optimization process proceeds as described for the DA application. The needed supporting algorithms are exactly the same as those used in FIG. 12, starting with 219 of FIGS. 12 and 18.

Figure 19:
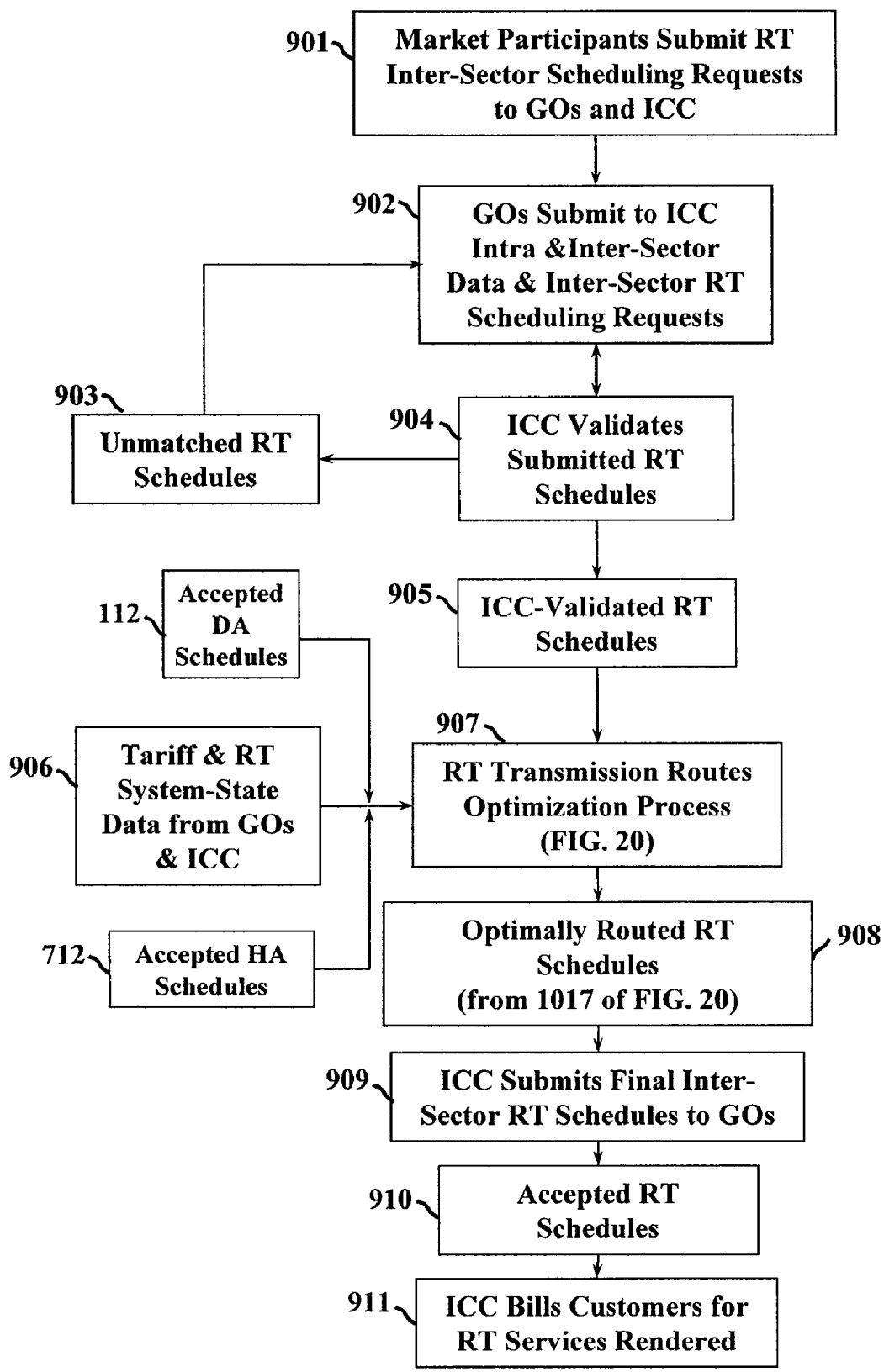
FIG. 19 is a flow chart providing an overview of a real-time inter-sector scheduling process in a three-settlement system.
Figure 20:
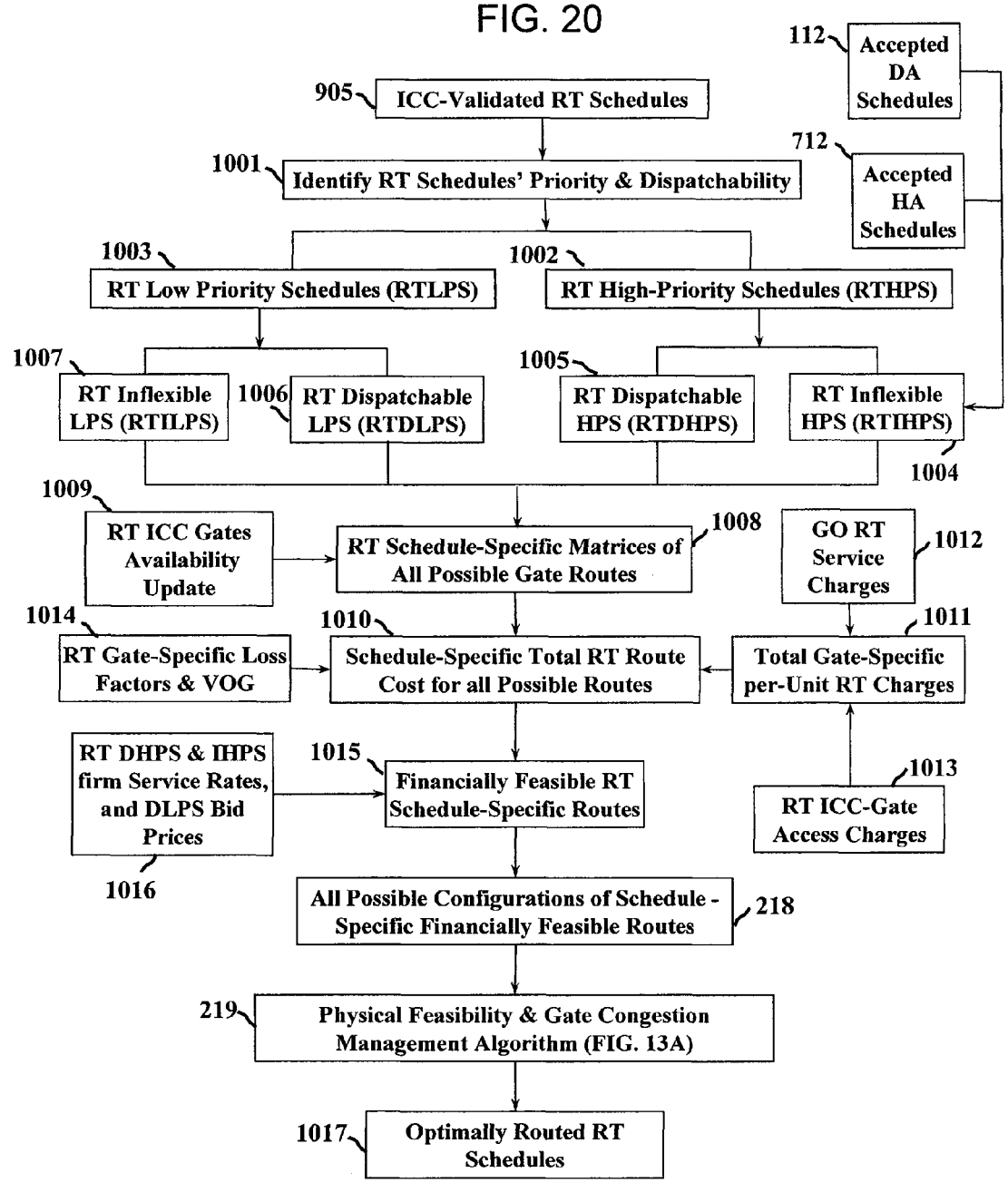
FIG. 20 is a flow chart of a real-time transmission routing optimization process in a three-settlement system.

C. The Normal Real-Time Inter-Sector Scheduling Process for Three-Settlement Systems As in the case of the HA application, the RT process represented by FIGS. 19 and 20 is essentially the same as the one for DA applications. With two exceptions, the description provided for FIGS. 11 and 12 applies here and will not be repeated. The differences between the two cases are: (i) the existence of committed DA and HA schedules for three-settlement system applications; and (ii) The absence of the GO review cycle (Steps 109 and 110 in FIG. 11) because of the impracticality of carrying out such steps in the limited time available before actual dispatching takes place. The presence of DA and HA scheduled capacity commitments is accounted for by 112 and 712 in FIGS. 19 and 20, respectively. In FIG. 19, accepted DA and HA schedules 112 and 712 are included in the inputs into the RT transmission routes optimization process 907. In FIG. 20, the DA and HA schedules 112 and 712 are incorporated as part of the RTIHPS 1004. The rest of the optimization process proceeds as described for the DA application. The needed supporting algorithms are exactly the same as those used in FIG. 12, starting with 219 of FIGS. 12 and 20.

Figure 21:
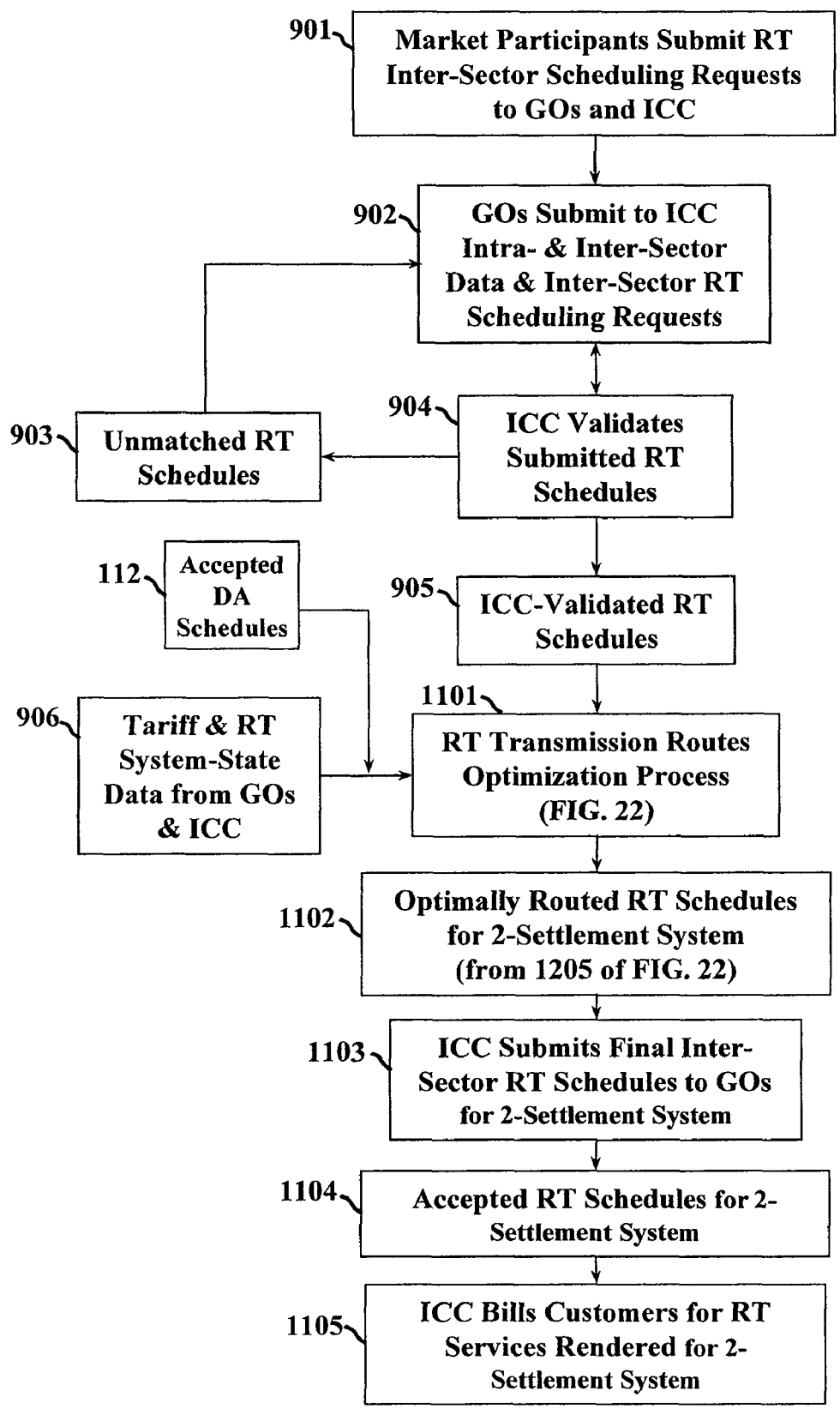
FIG. 21 is a flow chart providing an overview of a real-time inter-sector scheduling process in a two-settlement system.
Figure 22:
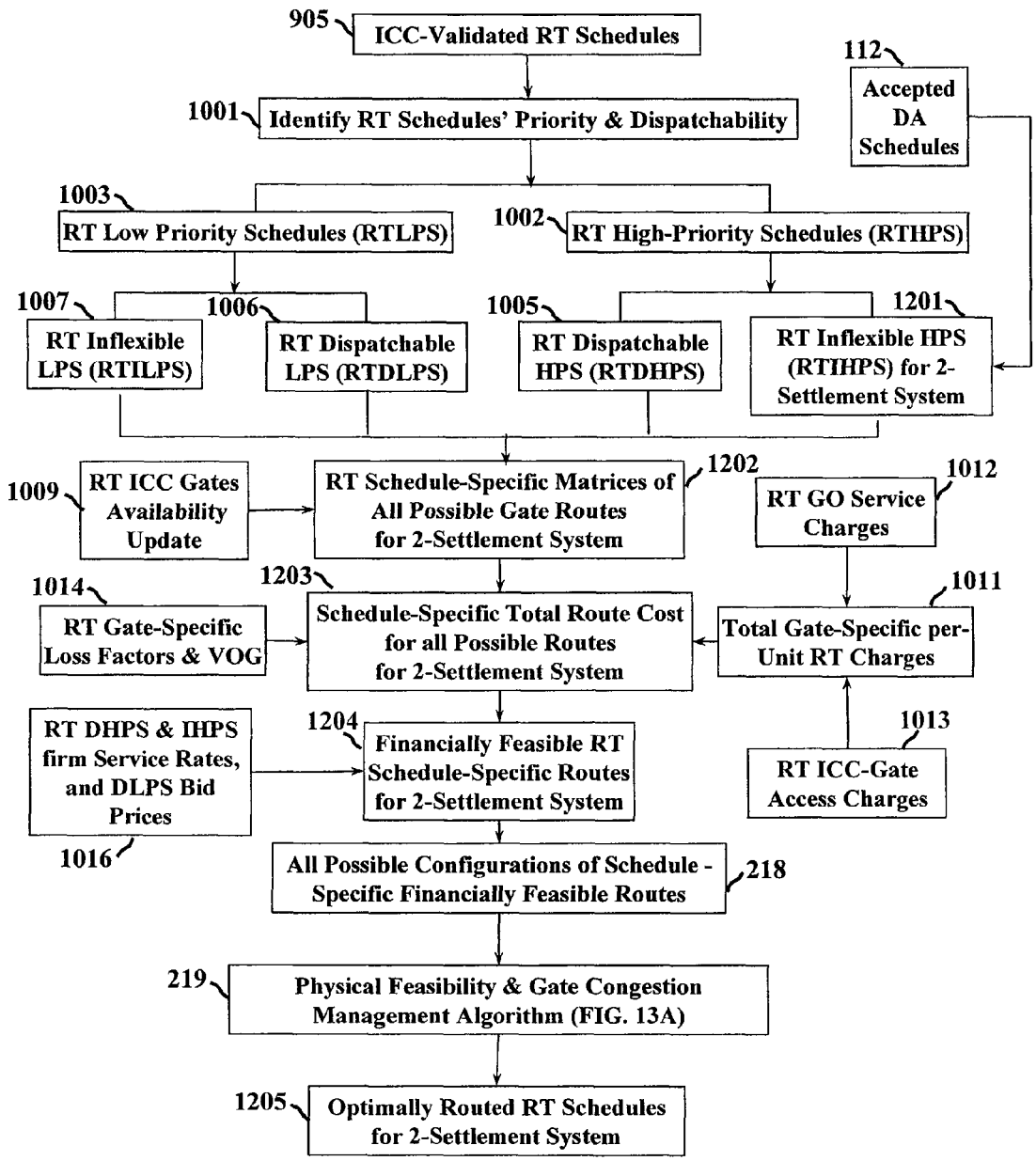
FIG. 22 is a flow chart of a real-time transmission routing optimization process in a two-settlement system.

D. The Normal Real-Time Inter-Sector Scheduling Process for Two-Settlement Systems Again, the RT process for two-settlement systems as depicted in FIGS. 21 and 22 is essentially the same as the process for DA applications. With two exceptions, the description given for FIGS. 11 and 12 applies here and will not be repeated. The differences between the two cases are: (i) the existence of committed DA schedules for two-settlement system applications; and (ii) The absence of the GO review cycle (Steps 109 and 110 in FIG. 11) because of the impracticality of carrying out such steps in the limited time available before actual dispatching takes place. The presence of DA scheduled capacity commitments is accounted for by 112 in FIGS. 21 and 22. In FIG. 21, accepted DA schedules 112 are included in the inputs into the RT transmission routes optimization process 1101. In FIG. 22, the DA schedules 112 are incorporated as part of the RTIHPS 1201. The rest of the optimization process proceeds as described for the DA application. The needed supporting algorithms are exactly the same as those used in FIG. 12, starting with 219 of FIGS. 12 and 22.

A variety of modifications, changes and variations to the invention are possible within the spirit and scope of the following claims. The invention should not be considered as restricted to the specific embodiments which have been described and illustrated with reference to the drawings.

GLOSSARY

CDF Curtailable Dominant-Flows
CFS Counter-Flow Schedules
CLPS Curtailable Low-Priority Service
CLPSS Curtailable Low-Priority Service Schedules
CMD Congestion Management Demand Curve
CMS Congestion Management Supply Curve
COG Capacity of Gate
COS Cost of Service
DA Day-Ahead
DFS Dominant Flow Schedules
DHPS Dispatchable HPS
DLPS Dispatchable LPS
DOSD Estimated Difference in OSD
GO Grid Operator
GR Gate Revenue
GS Gate Surplus Revenues
GU Gate Uplift Charge
HA Hour-Ahead
HPS High-Priority Schedules
ICC Interconnection Coordination Center
IHPS Inflexible HPS
ILPS Inflexible LPS
LPS Low-Priority Schedules
LPSS Low-Priority Service Schedules
MS Modified Schedules
MXD Maximum Demand
MXS Maximum Supply
NCMC Net Cost of Congestion Management
NCS Number of Curtailable Schedules
NFC Number of Feasible Configurations
NGF Net Gate Flow
NMS Number of Modified Schedules
NOCC Number of Curtailable Configurations
NOCG Number of Curtailable Gates
OLDHPS Old Value of DHPS
OLDLPS Old Value of DLPS
OSD Over-Scheduling Delta
PD Price of Demand Bids
PS Price of Supply Bids
RT Real Time
TCC Total Configuration's Curtailments
UC Uncurtailable Configurations
VOG Value of Generation

The invention claimed is:

1. A method of operating a power distribution network comprising a plurality of asynchronously operated ac sectors interconnected by controllable dc links, each of said sectors being subject to associated market rules, said method comprising:
   (a) scheduling power flow between said sectors based upon at least one inter-sector scheduling request;
   (b) controlling power flow between said sectors by controlling operation of said dc links in response to said at least one scheduling request;
   (c) matching contractually dependent paths of inter-sector transactions with physical paths of resulting inter-sector power flow.

2. A method as described in claim 1, wherein said at least one scheduling request is a request for substantially real-time delivery of electrical power to the sector making the request.

3. A method as described in claim 1, wherein said at least one scheduling request is a request for the delivery of electrical power to the sector making the request within about 1 hour from the time of such request.

4. A method as described in claim 1, wherein said at least one scheduling request is a request for the delivery of electrical power to the sector making the request within about 1 day from the time of such request.

5. A method as described in claim 1, wherein said network is a modified power distribution network where, before modification, said ac sectors were interconnected by ac power transmission paths and not by said dc links.

6. A method as described in claim 2, wherein said network is a modified power distribution network where, before modification, said ac sectors were interconnected by ac power transmission paths and not by said dc links.

7. A method as described in claim 3, wherein said network is a modified power distribution network where, before modification, said ac sectors were interconnected by ac power transmission paths and not by said dc links.

8. A method as described in claim 4, wherein said network is a modified power distribution network where, before modification, said ac sectors were interconnected by ac power transmission paths and not by said dc links.

* * * * *